(12) United States Patent
Li

(10) Patent No.: US 11,800,375 B2
(45) Date of Patent: Oct. 24, 2023

(54) BEAM TRAINING METHOD, RELATED APPARATUS, AND SYSTEM

(71) Applicant: HUAWEI TECHNOLOGIES CO., LTD., Guangdong (CN)

(72) Inventor: Yanchun Li, Boulogne Billancourt (FR)

(73) Assignee: Huawei Technologies Co., Ltd., Shenzhen (CN)

( * ) Notice: Subject to any disclaimer, the term of this patent is extended or adjusted under 35 U.S.C. 154(b) by 350 days.

(21) Appl. No.: 17/087,756

(22) Filed: Nov. 3, 2020

(65) Prior Publication Data

US 2021/0051489 A1  Feb. 18, 2021

Related U.S. Application Data

(63) Continuation of application No. PCT/CN2019/084290, filed on Apr. 25, 2019.

(30) Foreign Application Priority Data

May 4, 2018 (CN) .......................... 201810425049.X

(51) Int. Cl.
*H04W 16/28* (2009.01)
*H04B 7/06* (2006.01)
*H04W 64/00* (2009.01)

(52) U.S. Cl.
CPC .......... *H04W 16/28* (2013.01); *H04B 7/0617* (2013.01); *H04W 64/00* (2013.01)

(58) Field of Classification Search
CPC ... H04W 16/28; H04W 64/00; H04W 64/003; H04B 7/0617; H04B 7/088; H04B 7/0695
See application file for complete search history.

(56) References Cited

U.S. PATENT DOCUMENTS

| 2014/0055302 | A1 | 2/2014 | Jia |
| 2015/0045048 | A1* | 2/2015 | Xu ......................... H04W 4/023 |
| | | | 455/552.1 |
| 2016/0190686 | A1 | 6/2016 | Gao et al. |
| 2018/0115958 | A1* | 4/2018 | Raghavan ............ H04B 7/0697 |

(Continued)

FOREIGN PATENT DOCUMENTS

| CN | 106817157 A | 6/2017 |
| CN | 106982084 A | 7/2017 |
| CN | 107209258 A | 9/2017 |

(Continued)

OTHER PUBLICATIONS

Office Action issued in Chinese Application No. 201810425049.X dated May 31, 2022, 9 pages.

(Continued)

*Primary Examiner* — Fred A Casca
(74) *Attorney, Agent, or Firm* — Fish & Richardson P.C.

(57) ABSTRACT

Methods, devices, apparatus, and systems for beam training are provided. In one aspect, a beam training method includes: receiving, by a first device, a data frame that carries spatial location indication information of the first device and spatial location indication information of a second device and determining, by the first device based on the data frame, at least one of a transmit beam or a receive beam used for beam training between the first device and the second device.

15 Claims, 18 Drawing Sheets

Beam sweep frame (SSW Frame)

| Packet type (Packet type) | Packet direction (direction) | ID | CDOWN | AoD | ZoD | CRC |

(56) References Cited

U.S. PATENT DOCUMENTS

2018/0148720 A1* 5/2018 Ozes ................ C12Q 1/6886

FOREIGN PATENT DOCUMENTS

| CN | 107733484 A | 2/2018 |
|---|---|---|
| CN | 107888243 A | 4/2018 |
| WO | 2017146766 A1 | 8/2017 |
| WO | 2018006634 A1 | 1/2018 |
| WO | 2018059003 A1 | 4/2018 |

OTHER PUBLICATIONS

IEEE P802.11ay/D0.3, "Draft Standard for Information Technology; Telecommunications and Information Exchange Between Systems; Local and Metropolitan Area Networks; Specific Requirements; Part 11: Wireless LAN Medium Access Control (MAC) and Physical Layer (PHY) Specifications; Amendment 7: Enhanced throughput for operation in license-exempt bands above 45 GHz," Mar. 2017, 226 pages.

PCT International Search Report and Written Opinion issued in International Application No. PCT/CN2019/084290 dated Jul. 30, 2019, 14 pages (with English translation).

* cited by examiner

Beam sweep frame (SSW Frame)

| Packet type (Packet type) | Packet direction (direction) | ID | CDOWN | AoD | ZoD | CRC |
|---|---|---|---|---|---|---|

Beam sweep frame (SSW frame)

| Packet type (Packet type) | Packet direction (direction) | ID | CDOWN | Direction information (With direction info) | ... | Sector ID (Sector ID/ Beam ID (Beam ID) | CRC |
|---|---|---|---|---|---|---|---|

First query frame (beam direction query frame)

| Frame type (Frame type) | CDOWN 1 | ... | Sector ID (Sector ID)/ Beam ID (Beam ID) | CRC |
|---|---|---|---|---|

First query report frame (beam direction query announcement)

| Transmit power (Tx power) | CDOWN 1 | AoD 1 | ZoD 1 | ... | CRC |
|---|---|---|---|---|---|

FIG. 7B

Beam sweep frame (SSW Frame)

| Packet type (Packet type) | Packet direction (direction) | ID | CDOWN | AoD | ZoD | ... | Transmit power | CRC |
|---|---|---|---|---|---|---|---|---|

Beam sweep frame (SSW frame)

| Packet type (Packet type) | Packet direction (direction) | ID | CDOWN | ... | Sector ID (Sector ID)/ Beam ID (Beam ID) | Transmit power | CRC |
|---|---|---|---|---|---|---|---|

Second beam sweep frame (SSW frame)

| Packet type (Packet type) | Packet direction (direction) | ID | CDOWN | AoD | ZoD | ... | Sector ID (Sector ID)/ Beam ID (Beam ID) | Transmit power | CRC |

Third beam sweep frame (SSW frame)

| Packet type (Packet type) | Packet direction (direction) | ID | CDOWN | ... | Sector ID (Sector ID)/ Beam ID (Beam ID) | CRC |

FIG. 11B

Second beam sweep frame (SSW frame)

| Packet type (Packet type) | Packet direction (direction) | ID | CDOWN | ... | Sector ID (Sector ID)/ Beam ID (Beam ID) | Transmit power | CRC |
|---|---|---|---|---|---|---|---|

Third beam sweep frame (SSW frame)

| Packet type (Packet type) | Packet direction (direction) | ID | CDOWN | ... | Sector ID (Sector ID)/ Beam ID (Beam ID) | CRC |
|---|---|---|---|---|---|---|

BEAM TRAINING METHOD, RELATED APPARATUS, AND SYSTEM

CROSS-REFERENCE TO RELATED APPLICATIONS

This application is a continuation of International Application No. PCT/CN2019/084290, filed on Apr. 25, 2019, which claims priority to Chinese Patent Application No. 201810425049.X, filed on May 4, 2018. The disclosures of the aforementioned applications are hereby incorporated by reference in their entireties.

TECHNICAL FIELD

This application relates to the field of wireless communications and beamforming technologies, and in particular, to a beam training method, a related apparatus, and a system.

BACKGROUND

Development of a mobile service imposes an increasingly high requirement on a data rate and efficiency of wireless communications. In existing and future wireless communications systems, a beamforming technology is used to limit energy of a transmitted signal to a beam direction, to increase signal strength, improve signal sending and receiving efficiency, and improve communication quality.

Beam training is a main procedure in the beamforming technology. The beam training is a bidirectional beamforming frame transmission process, and a necessary signal is provided through beam training, so that two communications sides select, based on the signal, a sector beam direction suitable for sending and receiving the signal. After the beam training is successfully completed, the communication sides may determine the sector beam direction suitable for sending and receiving the signal, to adjust an antenna configuration, and transmit data by using the beamforming technology.

With an increasingly wide application range of beamforming, how to reduce a time consumed in beam training and improve beamforming efficiency is a problem that urgently needs to be resolved.

SUMMARY

This application provides a beam training method, a related apparatus, and a system, to converge a sector sweep range of a communications device in beam training, and improve beam training efficiency, thereby improving beamforming efficiency.

According to a first aspect, this application provides a beam training method, applied to a first device side. The beam training method includes: receiving, by a first device, a data frame, where the data frame carries spatial location indication information of the first device and spatial location indication information of a second device; and determining, by the first device based on the data frame, a transmit beam and/or a receive beam used for beam training between the first device and the second device.

According to a second aspect, this application provides a beam training method, applied to a network device side. The beam training method includes: generating, by a network device, a data frame, where the data frame carries spatial location indication information of a first device and spatial location indication information of a second device; and sending, by the network device, the data frame to the first device, where the data frame is used by the first device to determine a transmit beam and/or a receive beam used for beam training between the first device and the second device. In the method according to the second aspect, there may be one or more network devices. The network device may be a base station or an access point (AP) accessed by the first device.

In this application, the first device determines the transmit beam and/or the receive beam based on the information carried in the data frame in a plurality of manners. The following lists several possible determining methods.

(1) First determining method: The transmit beam and/or the receive beam are/is determined based on spatial coordinates of the first device and spatial coordinates of the second device.

Herein, the first device may determine the spatial coordinates of the first device based on the spatial location indication information of the first device carried in the data frame, and determine the spatial coordinates of the second device based on the spatial location indication information of the second device carried in the data frame. After determining the spatial coordinates of the first device and the spatial coordinates of the second device, the first device may learn of a direction in which the first device points to the second device, and determine, based on the direction in which the first device points to the second device, the transmit beam and/or the receive beam in all or some beams that can be formed by the first device.

(2) Second determining method: The transmit beam and/or the receive beam are/is determined by querying a mapping relationship table between information and the transmit beam and/or the receive beam based on the information carried in the data frame and information obtained in a process of receiving the data frame.

Herein, the mapping relationship table between the information and the transmit beam and/or the receive beam may be stored in the first device.

It may be understood that the determining methods are not limited to the foregoing two determining methods. In this application, the transmit beam and/or the receive beam may further be determined in another manner.

According to the beam training method described in the first aspect or the second aspect, the first device may converge a sector sweep range in beam training with the second device, to improve beam training efficiency, thereby improving beamforming efficiency.

It may be understood that when the first device determines that there is one transmit beam, transmit sector sweep may be omitted, and the beam is directly used as an optimal transmit beam of the first device. This is similar when the first device determines that there is one receive beam. In this case, a time consumed for beam training can further be reduced, and beamforming efficiency can be improved.

In this application, the spatial location indication information of the first device may be obtained in the following three different manners.

1. The spatial location indication information of the first device is obtained through a third device. In this case, the spatial location indication information of the first device may include the following several cases:

(1) The spatial location indication information of the first device may include angle information of a first beam and spatial coordinates of the third device.

(2) The spatial location indication information of the first device may include angle information of a first beam, a transmit power of a first beam sweep frame, and spatial coordinates of the third device.

In an optional embodiment, in the foregoing case (1) and case (2), the spatial location indication information of the first device may further include a transmit time of the first beam sweep frame.

In the foregoing case (1) and case (2), the first beam is a beam corresponding to the first beam sweep frame, and the first beam sweep frame is a beam sweep frame with optimal signal quality, a beam sweep frame whose signal quality is greater than a threshold, or an earliest received beam sweep frame, in beam sweep frames that are sent by the third device and that are received by the first device.

(3) The spatial location indication information of the first device includes a beam identifier of a second beam, angle information of the second beam, a transmit power of a second beam sweep frame, a beam identifier of a third beam, and spatial coordinates of the third device.

The second beam is a beam corresponding to the second beam sweep frame, the third beam is a beam corresponding to a third beam sweep frame, and the second beam sweep frame and the third beam sweep frame are sent by the third device to the first device.

(4) The spatial location indication information of the first device includes a beam identifier of a fourth beam and spatial coordinates of the third device.

The fourth beam is a beam corresponding to a fourth beam sweep frame, and the fourth beam sweep frame is a beam sweep frame with optimal signal quality, a beam sweep frame whose signal quality is greater than a threshold, or an earliest received beam sweep frame, in beam sweep frames that are sent by the first device and that are received by the third device.

2. The spatial location indication information of the first device is obtained through a third device. In this case, the spatial location indication information of the first device may include information related to the third device and information related to a fourth device.

The information related to the third device may include the following four cases:

(1) Angle information of a first beam and spatial coordinates of the third device.

(2) Angle information of a first beam, a transmit power of a first beam sweep frame, and spatial coordinates of the third device.

(3) Angle information of a second beam, a beam identifier of the second beam, a beam identifier of a third beam, and spatial coordinates of the third device.

(4) A beam identifier of a fourth beam and spatial coordinates of the third device.

Herein, the first beam is a beam corresponding to the first beam sweep frame, and the first beam sweep frame is a beam sweep frame with optimal signal quality, a beam sweep frame whose signal quality is greater than a threshold, or an earliest received beam sweep frame, in beam sweep frames that are sent by the third device and that are received by the first device.

Herein, the second beam is a beam corresponding to a second beam sweep frame, the third beam is a beam corresponding to a third beam sweep frame, and the second beam sweep frame and the third beam sweep frame are sent by the third device to the first device.

Herein, the fourth beam is a beam corresponding to a fourth beam sweep frame, and the fourth beam sweep frame is a beam sweep frame with optimal signal quality, a beam sweep frame whose signal quality is greater than a threshold, or an earliest received beam sweep frames that are sent by the first device and that are received by the third device.

The information related to the fourth device may include the following four cases:

(1) Angle information of a fifth beam and spatial coordinates of the fourth device.

(2) Angle information of a fifth beam, a transmit power of a fifth beam sweep frame, and spatial coordinates of the fourth device.

(3) Angle information of a sixth beam, a beam identifier of the sixth beam, a beam identifier of a seventh beam, and spatial coordinates of the fourth device.

(4) A beam identifier of an eighth beam and spatial coordinates of the fourth device.

The fifth beam is a beam corresponding to the fifth beam sweep frame, and the fifth beam sweep frame is a beam sweep frame with optimal signal quality, a beam sweep frame whose signal quality is greater than a threshold, or an earliest received beam sweep frame, in beam sweep frames that are sent by the fourth device and that are received by the first device.

The sixth beam is a beam corresponding to a sixth beam sweep frame, the seventh beam is a beam corresponding to a seventh beam sweep frame, and the sixth beam sweep frame and the seventh beam sweep frame are sent by the fourth device to the first device.

The eighth beam is a beam corresponding to an eighth beam sweep frame, and the eighth beam sweep frame is a beam sweep frame with optimal signal quality, a beam sweep frame whose signal quality is greater than a threshold, or an earliest received beam sweep frame, in beam sweep frames that are sent by the first device and that are received by the fourth device.

3. The spatial location indication information of the first device and the spatial location indication information of the second device are obtained through a network.

Specifically, a network server may store the spatial location indication information of the first device and the spatial location indication information of the second device, and the first device may obtain the spatial location indication information of the first device and the spatial location indication information of the second device from the network server through network connection.

Optionally, the spatial location indication information of the first device may include spatial coordinates of the first device. The spatial location indication information of the second device may also include the spatial coordinates of the first device. The spatial coordinates may be represented by using a latitude and longitude, polar coordinates, or three-dimensional coordinates.

According to a third aspect, this application provides a first device, where the first device may be configured to perform the beam training method described in the first aspect. The first device may include a memory, and a processor, a transmitter, and a receiver that are coupled to the memory. The transmitter is configured to send a signal, the receiver is configured to receive the sent signal, the memory is configured to store code for implementing the beam training method described in the first aspect, and the processor is configured to execute program code stored in the memory, in other words, to perform the beam training method according to the first aspect or the possible implementations of the first aspect.

According to a fourth aspect, this application provides a network device, where the network device may be configured to perform the beam training method described in the second aspect. The network device may include a memory, and a processor and a transmitter that are coupled to the memory. The processor is configured to generate a signal, the transmitter is configured to send the signal, the memory is configured to store code for implementing the beam training method described in the second aspect, and the processor is further configured to execute program code stored in the memory, in other words, to perform the beam training method according to the second aspect or the possible implementations of the second aspect.

According to a fifth aspect, this application provides a first device, including a plurality of functional modules, configured to perform the method according to the first aspect or the possible implementations of the first aspect.

According to a sixth aspect, this application provides a computer-readable storage medium. The readable storage medium stores program code for implementing the beam training method described in the first aspect or the possible implementations of the first aspect, and the program code includes an execution instruction for performing the beam training method described in the first aspect or the possible implementations of the first aspect.

According to a seventh aspect, this application provides a computer-readable storage medium. The readable storage medium stores program code for implementing the beam training method described in the second aspect or the possible implementations of the second aspect, and the program code includes an execution instruction for performing the beam training method described in the second aspect or the possible implementations of the second aspect.

According to an eighth aspect, a computer program product including an instruction is provided. When the computer program product runs on a computer, the computer performs the beam training method described in the first aspect or the possible implementations of the first aspect.

According to a ninth aspect, a computer program product including an instruction is provided. When the computer program product runs on a computer, the computer performs the beam training method described in the second aspect or the possible implementations of the second aspect.

During implementation of this application, the first device may determine the transmit beam and/or the receive beam used for beam training between the first device and the second device. During beam training, transmit sector sweep may be performed by using the determined transmit beam, and receive sector sweep may be performed by using the determined receive beam, without a need to traverse all sector beams, so that a sector sweep range is converged, and a time consumed for beam training can be reduced, thereby improving beamforming efficiency.

BRIEF DESCRIPTION OF DRAWINGS

FIG. 6A, FIG. 7A, FIG. 8A, FIG. 9A, FIG. 11A, FIG. 12A, and FIG. 13A are flowcharts of data frame interaction according to Embodiment 1 of this application;

FIG. 6B is a schematic structural diagram of a beam sweep frame according to Embodiment 1 of this application;

FIG. 7B is a schematic structural diagram of a beam sweep frame, a first query frame, and a first query report frame according to Embodiment 1 of this application;

FIG. 8B is a schematic structural diagram of another beam sweep frame according to Embodiment 1 of this application;

FIG. 9B is a schematic structural diagram of still another beam sweep frame according to Embodiment 1 of this application;

FIG. 11B and FIG. 12B are schematic structural diagrams of a second beam sweep frame and a third beam sweep frame according to Embodiment 1 of this application;

FIG. 13B is a schematic structural diagram of a first beam feedback frame according to this application;

DESCRIPTION OF EMBODIMENTS

Terms used in the embodiments of this application are only used to explain specific embodiments of this application, but are not intended to limit this application.

Figure 1:
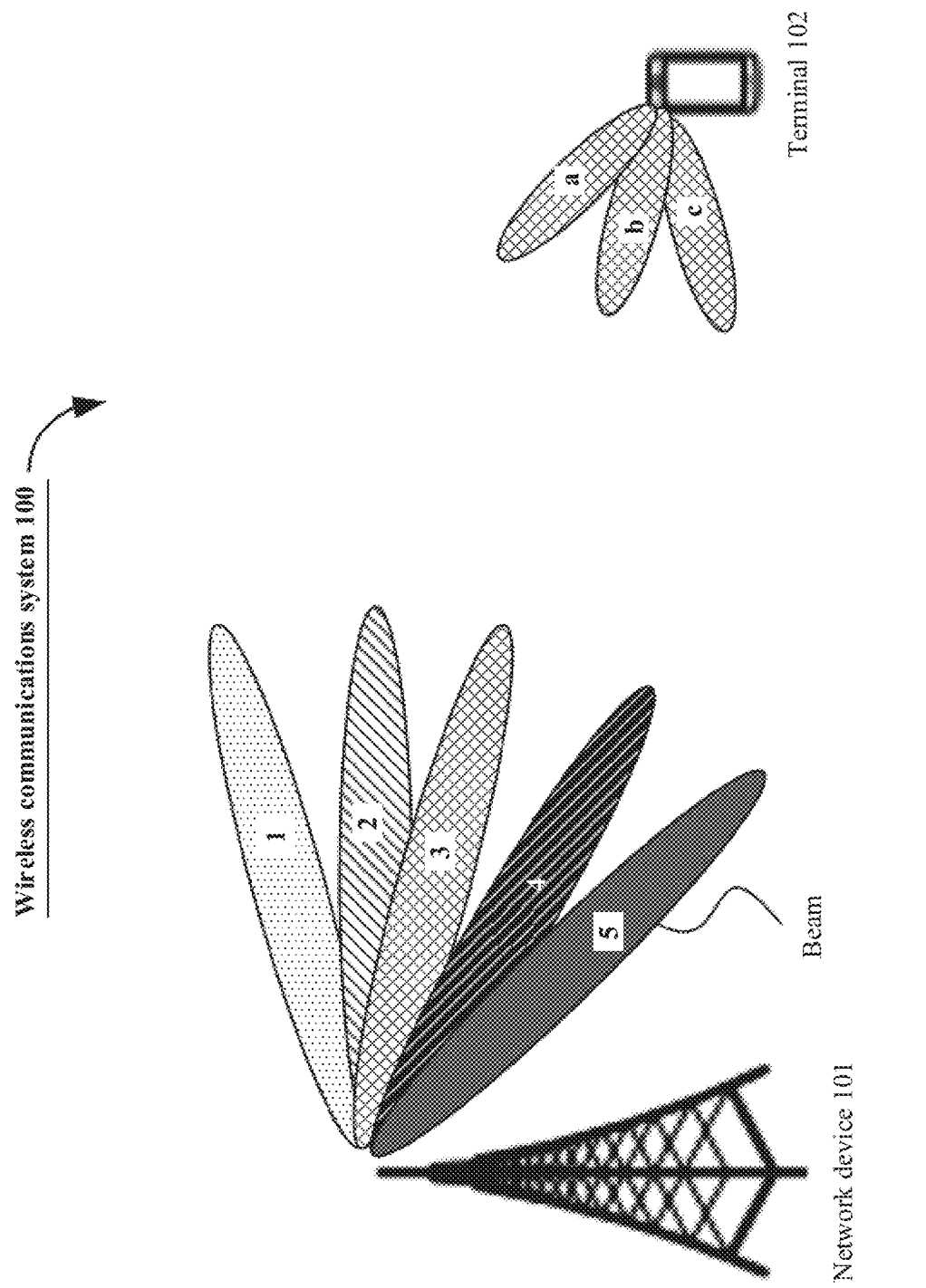
FIG. 1 is a schematic structural diagram of a wireless communications system according to this application.

Referring to FIG. 1, a wireless communications system in this application is first described. The wireless communications system in this application works on a high frequency band, and is not limited to a long term evolution (LTE) system, and may alternatively be a future evolved 5th generation (5G) mobile communications system, a new radio (NR) system, a machine-to-machine (M2M) communications system, a Wi-Fi system, or the like. As shown in FIG. 1, the wireless communications system 100 may include one or more network devices 101 and one or more terminals 102. The details are as follows:

The network device 101 may be distributed in the entire wireless communications system 100, and may be static or mobile. In some embodiments of this application, the network device 101 may be a base station. The base station may be configured to communicate with the one or more terminals, or may be configured to communicate with one or more base stations having some terminal functions. The base station may be a base transceiver station (BTS) in a time division synchronous code division multiple access (TD-SCDMA) system, or may be an evolved NodeB (evolutional node B, eNB) in an LTE system, or a base station in a 5G system or a new radio (NR) system. In addition, the network device 101 may alternatively be an access point (AP), a transit node (Trans TRP), a central unit (CU), or another network entity.

The terminal 102 may be distributed in the entire wireless communications system 100, and may be static or mobile. In some embodiments of this application, the terminal 102 may be a mobile phone, a pair of VR glasses, a mobile device, a mobile station, a mobile unit, an NEM terminal, a wireless unit, a remote unit, a terminal agent, a mobile client, or the like.

In this application, the wireless communications system 100 is a multi-beam communications system. The details are as follows:

The network device 101 may have a large-scale antenna array, control, by using a beamforming technology, the antenna array to form beams with different directions, and send and receive data by using these beams. Alternatively, an antenna array may be configured for the terminal 102, and the terminal 102 may send and receive by using beams in different directions. In other words, in the wireless communications system 100, the network device 101 and the terminal 102 communicate with each other by using a plurality of beams.

A beam formed by the network device 101 or the terminal 102 by using the beamforming technology has a specific coverage area. The coverage area is similar to a sector, and is referred to as a sector. Therefore, the beam may also be referred to as a sector beam.

It may be understood that when a network element transmits data to another network element, a beam used when the network element sends data to the another network element is referred to as a transmit beam, and a beam used when the network element receives data sent by the another network element is referred to as a receive beam. Optionally, the receive beam and the transmit beam corresponding to the receive beam may be a same beam, and the receive beam and the transmit beam may be received and transmitted by a same transceiver apparatus. Optionally, antenna ports respectively corresponding to the receive beam and the transmit beam corresponding to the receive beam may share a quasi co-location (QCL). Optionally, the quasi co-location indicates that at least one of the following parameters is the same or has a determined correspondence: an angle of arrival (AoA), a dominant angle of arrival (dominant AoA), an average angle of arrival, a power angular spectrum of an angle of arrival (power angular spectrum of AoA, PAS of AoA), an angle of departure (AoD), a dominant angle of departure, an average dominant angle of departure, a power angular spectrum of an dominant angle of departure, terminal transmit beam beamforming, terminal receive beam beamforming, a spatial channel correlation, base station transmit beam beamforming, base station receive beam beamforming, an average channel gain, an average channel delay, a delay spread, a doppler spread, and the like.

Figure 2:
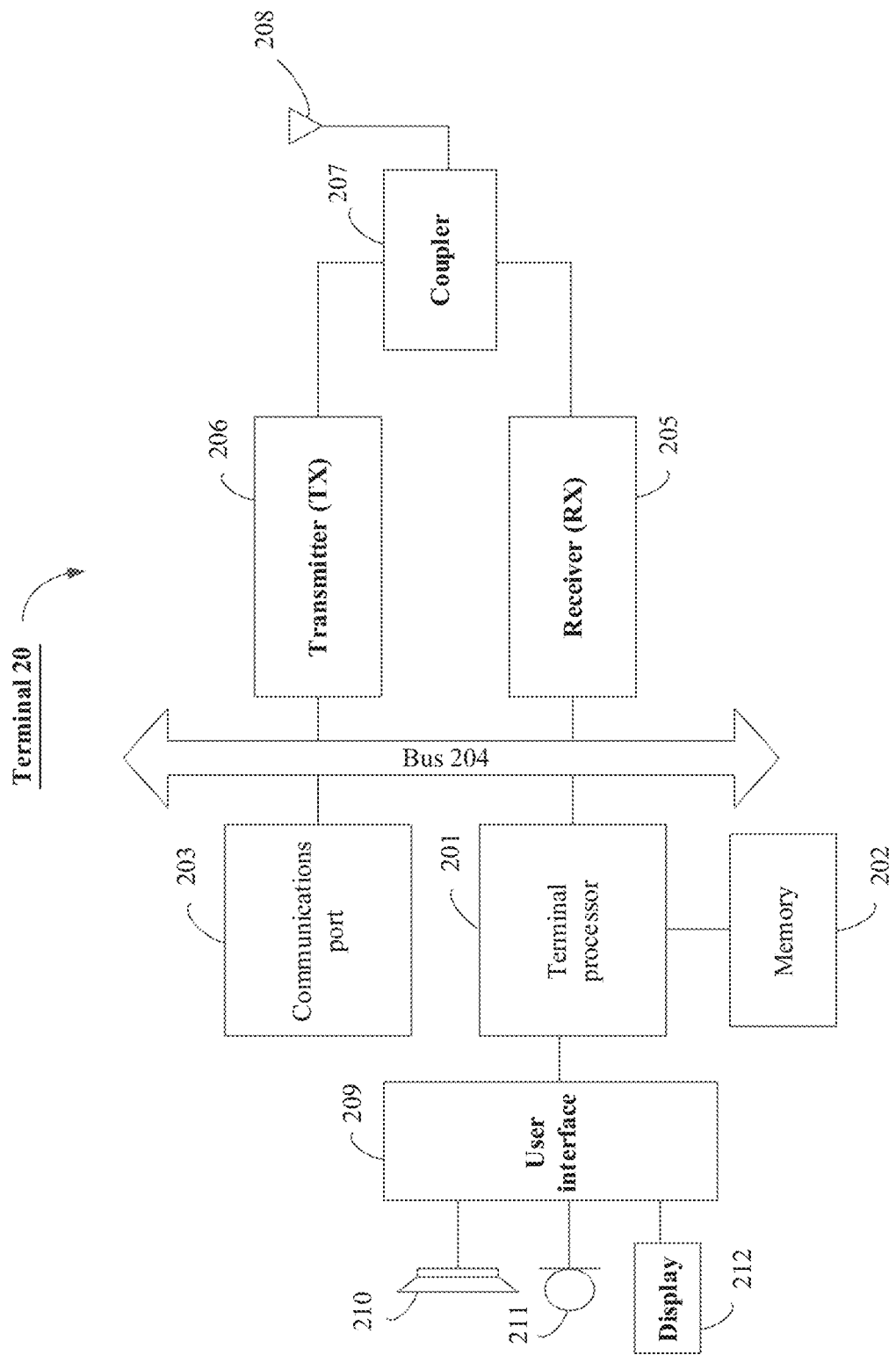
FIG. 2 is a schematic structural diagram of a terminal according to this application.

FIG. 2 is a schematic structural diagram of a terminal 20 according to this application. As shown in FIG. 2, the terminal 20 may include: one or more processors 201, a memory 202, a communications interface 203, a receiver 205, a transmitter 206, a coupler 207, an antenna 208, a user interface 209, and an input/output module (including an audio input/output module 210, a key input module 211, a display 212, and the like). These components may be connected by using a bus 204 or in another manner. In FIG. 2, an example in which the components are connected by using the bus is used. The details are as follows:

The communications interface 203 may be used by the terminal 20 to communicate with another communications device, for example, a network device. Specifically, the communications interface 203 may be a long term evolution (LTE) (4G) communications interface, a 5G communications interface, or a future new radio communications interface. In addition to the wireless communications interface, the terminal 20 may further have a wired communications interface 203, for example, a local access network (LAN) interface.

The transmitter 206 and the receiver 205 may be considered as a wireless modem. In the terminal 20, there may be one or more transmitters 206 and receivers 205. The antenna 208 may be configured to convert electromagnetic energy in a transmission line into an electromagnetic wave in free space, or convert an electromagnetic wave in free space into electromagnetic energy in a transmission line. The coupler 207 is configured to divide the mobile communications signal received by the antenna 208 into a plurality of signals and allocate the plurality of signals to a plurality of receivers 205. It may be understood that the antenna 208 may be implemented as a large-scale antenna array.

In addition to the transmitter 206 and the receiver 205 shown in FIG. 2, the terminal 20 may further include other communications components, for example, a GPS module, a Bluetooth module, and a wireless fidelity (Wi-Fi) module. In addition to the foregoing wireless communications signal, the terminal 20 may further support another wireless communications signal, for example, a satellite signal or a short-wave signal. In addition to wireless communication, the terminal 20 may further perform wired communication through a wired network interface (for example, a LAN interface).

The input/output module may be configured to implement interaction between the terminal 20 and a terminal/an external environment, and may mainly include the audio input/output module 210, the key input module 211, the display 212, and the like. Specifically, the input/output module may further include a camera, a touchscreen, a sensor, and the like. The input/output module communicates with the terminal processor 201 through the user interface 209.

The memory 202 is coupled to the terminal processor 201, and is configured to store various software programs and/or a plurality of sets of instructions. Specifically, the memory 202 may include a high-speed random access memory, and may further include a nonvolatile memory, for example, one or more disk storage devices, a flash memory device, or another nonvolatile solid-state storage device. The memory 202 may store an operating system (which is briefly referred to as a system below), for example, an embedded operating system such as Android, iOS, Windows, or Linux. The memory 202 may further store a network communications program. The network communications program may be used for communication with one or more additional devices, one or more terminal devices, and one or more network devices.

The memory 202 may further store a terminal interface program. The terminal interface program may vividly display content of an application program through a graphical operational window, and receive, by using an input control such as a menu, a dialog box, or a key, a control operation performed by the terminal on the application program. In some embodiments of this application, the memory 202 may be configured to store a program for implementing, on the terminal 20 side, the beam training method according to one or more embodiments of this application. For an implementation of the beam training method according to one or more embodiments of this application, refer to the following embodiments.

The terminal processor 201 may be configured to read and execute a computer-readable instruction. Specifically, the terminal processor 201 may be configured to: invoke a program stored in the memory 202, for example, the program for implementing, on the terminal 20 side, the beam training method according to one or more embodiments of this application; and execute an instruction included in the program.

It may be understood that the terminal 20 may be the terminal 102 in the wireless communications system 100 shown in FIG. 1, and may be implemented as a mobile device, a mobile station, a mobile unit, a wireless unit, a remote unit, a mobile client, or the like.

It should be noted that the terminal 20 shown in FIG. 2 is merely an implementation of this embodiment of this application. In actual application, the terminal 20 may further include more or fewer components. This is not limited herein.

Figure 3:
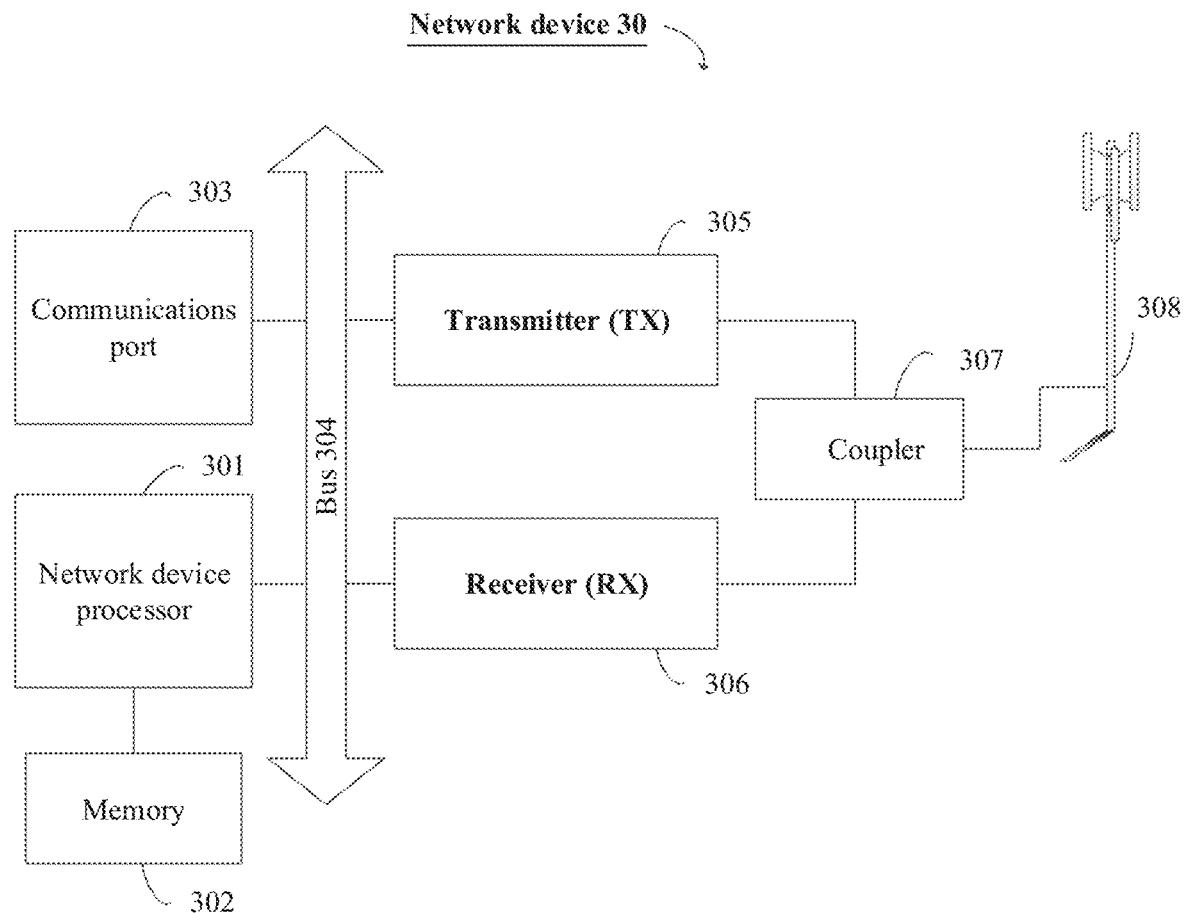
FIG. 3 is a schematic structural diagram of a network device according to this application.

FIG. 3 shows a network device 30 according to some embodiments of this application. Herein, the network device 30 may be implemented as the network device 101 in the communications system shown in FIG. 1. As shown in FIG. 3, the network device 30 may include one or more network device processors 301, a memory 302, a communications port 303, a transmitter 305, a receiver 306, a coupler 307, and an antenna 308. These components may be connected by using a bus 304 or in another manner. In FIG. 3, an example in which the components are connected by using the bus is used. The details are as follows:

The communications port 303 may be used by the network device 30 to communicate with another communications device, for example, a terminal device or another network device. Specifically, the terminal device may be the terminal 20 shown in FIG. 2. Specifically, the communications port 303 may be a long term evolution (LTE) (4G) communications interface, a 5G communications interface, or a future new radio communications interface. In addition to a wireless communications interface, the network device 30 may further have a wired communications port 303 to support wired communication. For example, a backhaul connection between a network device 30 and another network device 30 may be a wired communication connection.

In some embodiments of this application, the transmitter 305 and the receiver 306 may be considered as a wireless modem. The transmitter 305 may be configured to transmit a signal output by the network device processor 301, for example, to implement directional sending through beamforming. The receiver 306 may be configured to receive a signal, for example, to implement directional reception through beamforming. In the network device 30, there may be one or more transmitters 305 and receivers 306. The antenna 308 may be configured to convert electromagnetic energy in a transmission line into an electromagnetic wave in free space, or convert an electromagnetic wave in free space into electromagnetic energy in a transmission line. The coupler 307 may be configured to divide a mobile communications signal into a plurality of signals, and allocate the plurality of signals to a plurality of receivers 306. It may be understood that the antenna 308 of the network device may be implemented as a large-scale antenna array.

The memory 302 is coupled to the network device processor 301, and is configured to store various software programs and/or a plurality of sets of instructions. Specifically, the memory 302 may include a high-speed random access memory, and may further include a nonvolatile memory, for example, one or more disk storage devices, a flash memory device, or another nonvolatile solid-state storage device.

The memory 302 may store an operating system (which is briefly referred to as a system below), for example, an embedded operating system such as uCOS, VxWorks, or RTLinux. The memory 302 may further store a network communications program. The network communications program may be used for communication with one or more additional devices, one or more terminal devices, and one or more network devices.

In this embodiment of this application, the network device processor 301 may be configured to read and execute a computer-readable instruction. Specifically, the network device processor 301 may be configured to: invoke a program stored in the memory 302, for example, the program for implementing, on the network device 30, the beam training method according to one or more embodiments of this application; and execute an instruction included in the program.

It may be understood that the network device 30 may be the terminal 102 in the wireless communications system 100 shown in FIG. 1, and the network device 30 may be implemented as a base transceiver station, a wireless transceiver, a basic service set (BSS), an extended service set (ESS), an NodeB, an eNodeB, a gNodeB, an access point, a TRP, or the like.

It should be noted that the network device 30 shown in FIG. 3 is merely an implementation of this embodiment of this application. In actual application, the network device 30 may further include more or fewer components. This is not limited herein.

According to the foregoing communications system and the related device, this application provides a beam training method, to converge a sector sweep range of a communications device in a sector level sweep (SLS) phase in beam training, and improve beam training efficiency, thereby improving beamforming efficiency. In this application, a beam training process between the first device and the second device is used as an example to describe the beam training method in this application.

A main inventive idea of this application is to converge, based on a spatial location of the first device and a spatial location of the second device, a sector sweep range used when beam training is performed between the first device and the second device.

Herein, the spatial location of the first device may be obtained in a plurality of manners. A most common manner is that the first device obtains the spatial location of the first device via a positioning system such as a GPS. However, there are at least the following two disadvantages of the manner in which the spatial location of the first device is obtained via a positioning system such as a GPS: 1. Not all communications devices are in GPS signal coverage, and a communications device in an indoor or underground environment cannot receive a GPS signal and cannot perform positioning via the GPS. 2. GPS positioning is inaccurate, and consequently, the spatial location of the first device obtained via a positioning system such as the GPS is inaccurate.

In this application, the first device obtains the spatial location of the first device through another device. In this application, a manner of obtaining the spatial location of the first device is not limited to a use environment, and a relatively accurate spatial location of the first device can be obtained.

Figure 4:
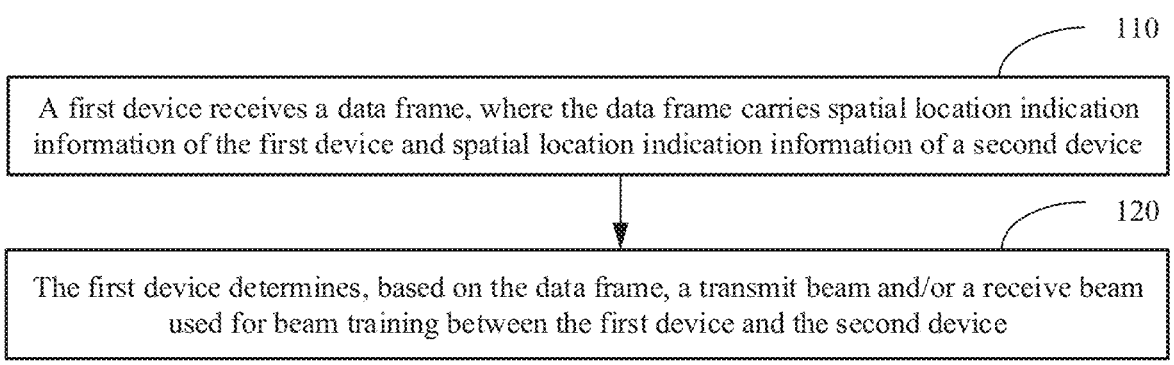
FIG. 4 is a schematic flowchart of a beam training method according to this application.

FIG. 4 is a schematic flowchart of a beam training method according to this application. As shown in the figure, the method may include the following steps.

S110. A first device receives a data frame, where the data frame carries spatial location indication information of the first device and spatial location indication information of a second device.

In this application, the first device may be a network device (such as a base station or an AP) in the communications system shown in FIG. 1, or may be a terminal in the communications system shown in FIG. 1. The first device has an antenna array, and may control, by using a beamforming technology, the antenna array to form beams with different directions.

In this application, the second device may be a network device (such as a base station or an AP) in the communications system shown in FIG. 1, or may be a terminal in the communications system shown in FIG. 1. The second device may have an antenna array, or may have only a single antenna.

Specifically, the data frame may be sent by one or more devices. For example, when the first device is a terminal, the data frame may be sent by a base station or an AP accessed by the terminal. Herein, the base station or the AP accessed by the terminal is a base station or an AP that has a connection relationship with the terminal, that is, the terminal performs operations such as authentication and session connection establishment at the base station or the AP, to access the base station or the AP. For another example, the data frame may be sent in a broadcast manner by a base station or an AP that has no connection relationship with the terminal, and the first device may receive the data frame broadcast by the base station or the AP. Herein, that the base station or the AP has no connection relationship with the terminal indicates that the terminal does not perform an operation such as authentication or session connection establishment at the base station or the AP to access the base station or the AP, but the terminal can receive the data frame sent by the base station or the AP.

In this application, the data frame carries the spatial location indication information of the first device and the spatial location indication information of the second device.

S120. The first device determines, based on the data frame, a transmit beam and/or a receive beam used for beam training between the first device and the second device.

It may be understood that a transmit beam and/or a receive beam subsequently mentioned in this application are/is the transmit beam and/or the receive beam used for beam training between the first device and the second device.

In this application, the first device determines the transmit beam and/or the receive beam based on the information carried in the data frame in a plurality of manners. The following lists several possible determining methods.

(1) First determining method: The transmit beam and/or the receive beam are/is determined based on spatial coordinates of the first device and spatial coordinates of the second device.

Specifically, the first device determines the spatial coordinates of the first device based on the spatial location indication information of the first device carried in the data frame, and determines the spatial coordinates of the second device based on the spatial location indication information of the second device carried in the data frame. Herein, for a method in which the first device determines the spatial coordinates of the first device and the spatial coordinates of the second device, refer to related descriptions in subsequent embodiments.

After determining the spatial coordinates of the first device and the spatial coordinates of the second device, the first device may learn of a direction in which the first device points to the second device, and determine, based on the direction in which the first device points to the second device, the transmit beam and/or the receive beam in all or some beams that can be formed by the first device.

(2) Second determining method: The transmit beam and/or the receive beam are/is determined by querying a mapping relationship table between the information and the transmit beam and/or the receive beam based on the information carried in the data frame and information obtained in a process of receiving the data frame.

Herein, the mapping relationship table between the information and the transmit beam and/or the receive beam may be stored in the first device.

It may be understood that the determining methods are not limited to the foregoing two determining methods. In this application, the transmit beam and/or the receive beam may further be determined in another manner.

Optionally, the first device may further determine the transmit beam and/or the receive beam based on the information carried in the data frame and posture information of the first device. Specifically, the first device may move, and when a posture of the first device changes, a direction of a beam that may be generated also changes. For example, the first device is a mobile phone. When the screen of the mobile phone faces upward, a beam generated by an antenna on the screen side points upward; or when the screen of the mobile phone faces downward, a beam generated by an antenna on the screen side points downward. In other words, when postures of the mobile phone are different, directions of a same beam are also different. A change of a beam direction is fully considered in a manner of determining the transmit beam and/or the receive beam by using the posture information of the first device, so that the determined transmit beam and/or receive beam can more accurately point to the second device.

Optionally, the posture information of the first device may be obtained by using a measurement device, such as a gyroscope, a gravity meter, or a compass, that is configured by the first device. Optionally, the posture information of the first device may alternatively be obtained by a visual device configured by the first device. For example, a camera is used to capture a feature object in a scene, and the posture information of the first device is obtained based on different locations at which the feature object appears in the scene.

In this application, the first device determines at least one transmit beam and/or at least one receive beam in all or some beams that can be formed. In the at least one transmit beam and the at least one receive beam, some beams may be the same, or all beams may be the same (to be specific, the transmit beam and the receive beam determined by the first device are the same).

Optionally, an included angle between a beam direction of the transmit beam determined by the first device and a direction in which the first device points to the second device is less than a first threshold, and an included angle between a beam direction of the receive beam determined by the first device and the direction in which the first device points to the second device is less than a second threshold. The first threshold and the second threshold may be preset, for example, may be 10 degrees or 20 degrees. It may be understood that a smaller value of the first threshold indicates a smaller quantity of finally determined transmit beams. Similarly, a smaller value of the second threshold indicates a smaller quantity of finally determined receive beams.

In an optional embodiment, after determining the transmit beam and/or the receive beam used for beam training between the first device and the second device, the first device performs transmit sector sweep in beam training by using the determined transmit beam, and performs receive sector sweep in beam training by using the determined receive beam.

Specifically, the transmit sector sweep in beam training is used by the first device to determine an optimal transmit beam used when the first device sends data to the second device. When the first device determines a plurality of transmit beams, a process of the transmit sector sweep includes: separately sending, by the first device by using the plurality of transmit beams, beam sweep frames to the second device; and receiving, by the second device, the plurality of beam sweep frames, determining a beam sweep frame with optimal signal quality, and feeding back a beam (that is, the optimal transmit beam) corresponding to the beam sweep frame to the first device, so that the first device learns of the optimal transmit beam used when sending the data to the second device.

When determining the beam sweep frame with the optimal signal quality, the second device may determine the beam sweep frame based on at least one of the following: a path loss (PL), a signal received power, a signal gain, a reference signal (which is carried in the beam sweep frame) received power (reference signal received power, RSRP), a signal-to-noise ratio, a signal-to-interference-noise ratio, a delay spread of a channel, and the like.

Specifically, the receive sector sweep in beam training is used by the first device to determine an optimal receive beam used when the first device receives data sent by the second device. When the first device determines a plurality of receive beams, a process of the receive sector sweep includes: separately receiving, by the first device by using the plurality of receive beams, beam sweep frames sent by the second device; and determining a beam sweep frame with optimal signal quality, where a beam used by the first device to receive the beam sweep frame with the optimal signal quality is the optimal receive beam. A process in which the first device determines the beam sweep frame with the optimal signal quality is similar to the foregoing process in which the second device determines the beam sweep frame with the optimal signal quality. Details are not described herein again.

It may be understood that when the first device determines that there is one transmit beam, the first device does not need to perform transmit sector sweep, and directly uses the determined transmit beam as the optimal transmit beam. Similarly, when the first device determines that there is one receive beam, the first device does not need to perform receive sector sweep, and directly uses the determined receive beam as the optimal receive beam.

In application, the first device may receive the data frame in step S110 on a same frequency band or channel or on different frequency bands or channels, and perform the process of the receive sector sweep and/or the process of the transmit sector sweep.

It can be learned from the foregoing description that the first device may determine the transmit beam and/or the receive beam used for beam training between the first device and the second device. During beam training, the transmit sector sweep may be performed by using the determined transmit beam, and the receive sector sweep may be performed by using the determined receive beam, without a need to traverse all sector beams, so that a sector sweep range is converged, and a time consumed for beam training can be reduced, thereby improving beamforming efficiency.

The following describes in detail, by using three embodiments, a data frame interaction process in the beam training method shown in FIG. 4 and how the first device determines a transmit beam and/or a receive beam.

In the following three embodiments, the data frame carries the spatial location indication information of the first device and the spatial location indication information of the second device. The following three embodiments mainly describe content and a sending manner of the spatial location indication information of the first device and the spatial location indication information of the second device that are carried in the data frame.

In Embodiment 1 and Embodiment 2, the spatial location indication information of the second device may be polar coordinates, three-dimensional coordinates, or the like of the second device, may be carried in a beacon frame, a management frame, or a frame of another type, and may be sent by any device that stores the spatial location indication information of the second device. Optionally, the device may be any device that has a connection relationship with the first device. For example, the first device is a terminal, the second device is an AP 2, the terminal has accessed any device such as an AP 0 or AP 1 that has a connection relationship with the terminal, and the AP 0 or AP 1 stores spatial coordinates of the AP 2 and sends the spatial coordinates of the AP 2 to the terminal.

In this application, coordinates described below may be established with reference to a spherical surface (for example, an earth surface), or may be established with reference to a rectangular coordinate system (for example, an earth surface within a small range may be approximately a plane).

In the following, how the first device obtains the spatial location indication information of the first device, and specific content of the spatial location indication information are mainly discussed in Embodiment 1 and Embodiment 2.

1. Embodiment 1

In this embodiment, a first device obtains spatial location indication information of the first device through a third device. Both the first device and the third device have a beamforming capability. The third device may be a network device or a terminal device in a communications system.

Figure 5:
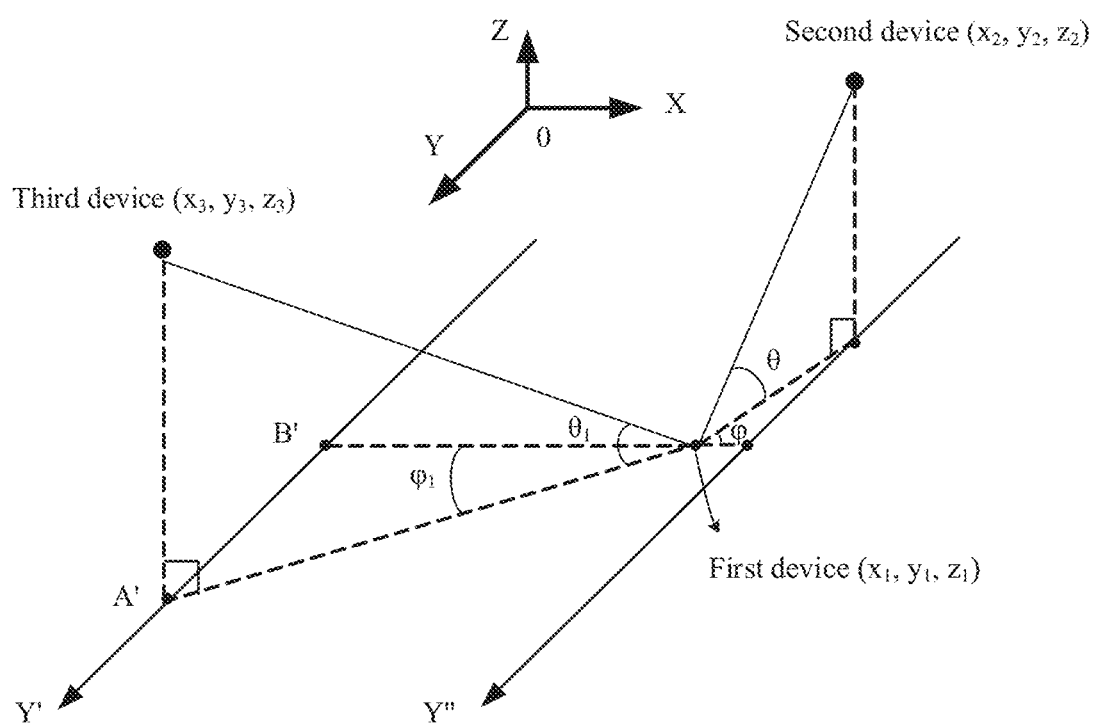
FIG. 5 is a schematic scenario diagram of a first device, a second device, and a third device according to Embodiment 1 of this application.

Optionally, in this embodiment, there may be a connection relationship (a wireless connection or a wired connection) between the first device and the third device. For example, the first device is a terminal, and the third device may be an AP accessed by the first device. Optionally, in this embodiment, there may be alternatively no connection relationship between the first device and the third device. FIG. 5 is a schematic scenario diagram of a first device, a second device, and a third device.

This embodiment may include the following four implementations:

(1) Implementation 1

In Implementation 1, the spatial location indication information of the first device includes angle information of a first beam and spatial coordinates of the third device. The first beam is a beam corresponding to a first beam sweep frame, and the first beam sweep frame is a beam sweep frame with optimal signal quality, a beam sweep frame whose signal quality is greater than a threshold, or an earliest received beam sweep frame, in beam sweep frames that are sent by the third device and that are received by the first device.

The spatial coordinates of the third device may be information that can reflect a spatial location of the third device, such as polar coordinates or three-dimensional coordinates. Optionally, the spatial coordinates of the third device may be sent to the first device by any device that stores the spatial coordinates. For example, the first device is a terminal and the third device is an AP 1, the first device (the terminal) has accessed an AP 0 and the third device (the AP 1), and the AP 0 may store spatial coordinates of the AP 1 and send the spatial coordinates of the AP 1 to the terminal, or the third device (the AP 1) may send the spatial coordinates of the third device to the first device (the terminal). It may be understood that when the spatial coordinates of the third device are sent by the third device to the first device, the spatial coordinates of the third device may be carried in any data frame sent by the third device to the first device in this implementation.

The following mainly discusses how the first device receives the data frame, to obtain information other than the spatial coordinates of the third device in the spatial location indication information of the first device, that is, the angle information of the first beam. There are two data 1. First Data Frame Interaction Manner In the first data frame interaction manner, the data frame includes the first beam sweep frame (SSW frame), and the first beam sweep frame carries the angle information of the first beam.

Figures 6A, 6B:
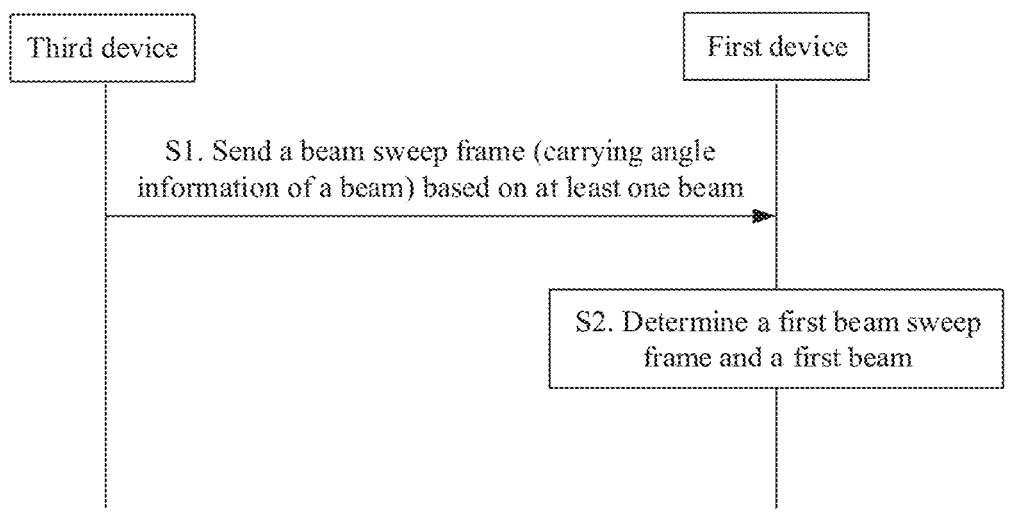

FIG. 6A is a flowchart of the first data frame interaction manner, and the following steps are included.

S1. The third device sends a beam sweep frame to the first device by using at least one beam, where the beam sweep frame carries angle information of a corresponding beam.

Specifically, the third device controls, by using a beamforming technology, an antenna array to form the at least one beam, and sends the beam sweep frame to the first device by using the at least one beam. FIG. 6B shows a possible structure of the beam sweep frame sent by the third device to the first device in the first data frame interaction manner.

Herein, the beam sweep frame shown in FIG. 6B is transmitted at a data link layer, and may be obtained through mapping by using a packet transmitted at a network layer. As shown in FIG. 6B, a packet type field in the beam sweep frame indicates a type of a packet transmitted at the network layer. The packet type is related to fields specifically included in the beam sweep frame, and frames corresponding to different packet types may include different fields. For example, the first device may learn, by using the packet type field in the beam sweep frame in FIG. 6B, that the beam sweep frame includes a direction field, an ID field, a CDOWN field, an AoD field, a ZoD field, a cyclic redundancy check (CRC) field, and the like.

The direction field indicates whether a packet to which the beam sweep frame is mapped is an uplink packet or a downlink packet, or indicates whether the packet is a downlink packet from an AP or a downlink packet not from an AP, or indicates whether the packet is a downlink packet from a device that has been located (with accurate coordinates information) or a device that has not been located.

The ID field indicates an ID of a device that sends the packet or an ID of a device that receives the packet.

The CDOWN field indicates a quantity of subsequent beam sweep frames after the beam sweep frame. For example, when a value of the CDOWN is "5", it indicates that there are still five subsequent beam sweep frames to be sent to the first device. Optionally, the beam sweep frame may further include a redundancy check bit CRC.

As shown in the figure, angle information of a beam corresponding to the beam sweep frame is carried in at least one of the following fields: an angle of departure (AoD) field and a zenith angle of departure (ZoD) field. The AoD field indicates a horizontal angle of the beam, and the ZoD field indicates a vertical angle of the beam.

Referring to FIG. 5, the horizontal angle and an elevation angle are each expressed as a line segment with a direction. As shown in the figure, a direction in which the first device points to the third device is used as an example. Any two points A and B (for ease of description, A is a location of the third device, and B is a location of the first device) are randomly selected in the direction. A point that is projected by A to a horizontal plane that passes through B and that is parallel to an XOY plane is A', a point that is projected by B to a vertical plane that passes through A and that is parallel to a YOZ plane is B'. An included angle between B-B' and B-A' is a horizontal angle in this direction, and an included angle between B-A and B-A' is a vertical angle $\phi_1$ in this direction. It may be understood that, a horizontal angle corresponding to a straight line or a line segment that A points to B satisfies $\phi'_1=360°-\phi_1$, and a vertical angle satisfies $\theta'_1=-\theta_1$. It may be understood that the horizontal angle and the elevation angle of the beam are a horizontal angle and an elevation angle in a main lobe direction of the beam.

It may be understood that all the foregoing fields may appear in a field in a form of a subfield, and the field may be named as a beamforming information field, a sector sweeping field, or another name.

S2. The first device receives at least one beam sweep frame, and determines the first beam sweep frame and the first beam.

Optionally, the first device may select, from a plurality of beam sweep frames, a beam sweep frame with optimal signal quality as the first beam sweep frame, and a corresponding beam used by the third device to transmit the first beam sweep frame is used as the first beam.

Optionally, the first device may select any beam sweep frame whose signal quality is greater than a threshold as the first beam sweep frame, and a corresponding beam used by the third device to transmit the first beam sweep frame is used as the first beam.

Optionally, the first device may select an earliest received beam sweep frame as the first beam sweep frame, and a corresponding beam used by the third device to transmit the first beam sweep frame is used as the first beam.

After the foregoing steps are performed, the first device can learn of the angle information of the first beam.

2. Second Data Frame Interaction Manner

In the second data frame interaction manner, the data frame includes the first beam sweep frame (SSW frame) and a first query report frame (beam direction announcement), and the first beam sweep frame carries a beam identifier of the first beam. The first query report frame carries the angle information of the first beam.

Figure 7A:
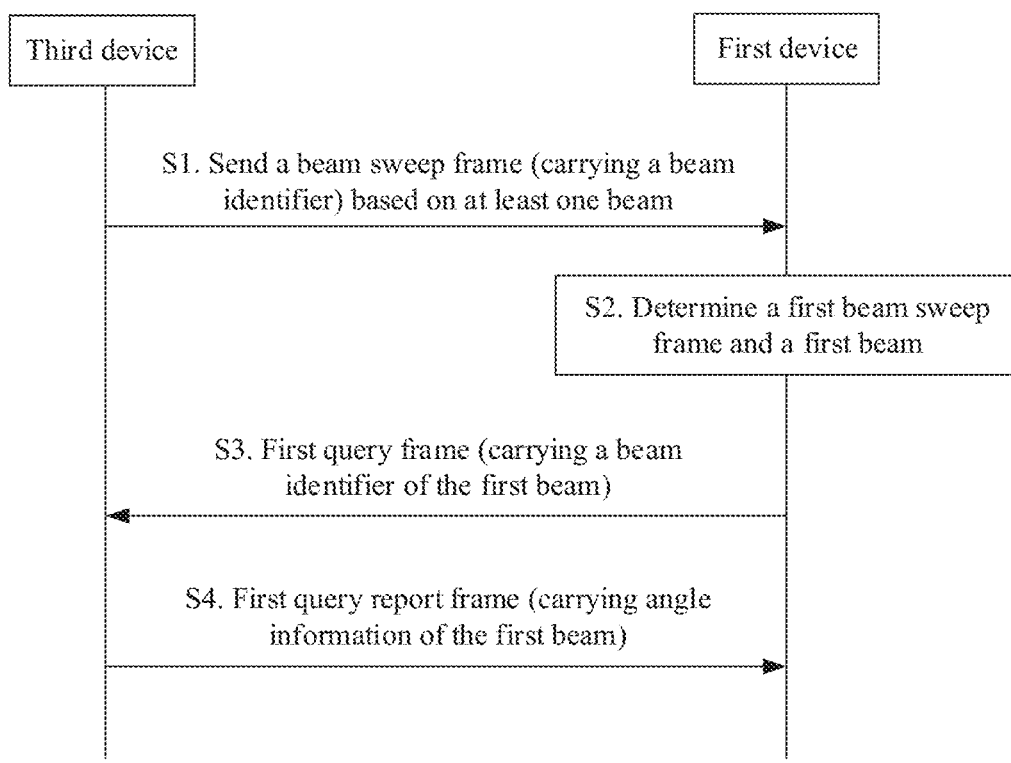

A difference between the second data frame interaction manner and the first data frame interaction manner lies in that the angle information of the first beam is sent by the third device after the third device receives an inquiry frame of the first device. FIG. 7A is a flowchart of the second data frame interaction manner, and the following steps are included.

S1. The third device sends a beam sweep frame (SSW frame) to the first device by using at least one beam, where the beam sweep frame carries a beam identifier of a corresponding beam.

Specifically, the third device controls, by using a beamforming technology, an antenna array to form the at least one beam, and sends the beam sweep frame to the first device by using the at least one beam. FIG. 7B shows a possible structure of the beam sweep frame sent by the third device to the first device in the second data frame interaction manner. As shown in the figure, the beam sweep frame includes a field used to indicate a beam identifier. Optionally, the field may be a sector ID field or a beam ID field, and is used to directly indicate a beam identifier of a corresponding beam. Optionally, the field may be a CDOWN field, and is used to indirectly indicate a beam identifier of a corresponding beam. For example, when a value of the CDOWN field is "5", it indicates an order of the beam sweep frame in all beam sweep frames sent by the third device (the beam sweep frame is a last but five beam sweep frame sent by the third device), the first device may feed back the CDOWN value to the third device, and the third device may learn of, based on the order of sending the beam sweep frame, a beam identifier of a beam corresponding to the beam sweep frame.

Herein, the beam identifier may be a beam number. For example, beams of the network device 101 in the communications system shown in FIG. 1 may include a beam 1 to a beam 5, and beams of the terminal 102 may include a beam a to a beam c.

Optionally, the beam sweep frame may further include a flag bit (with direction info), and is used to indicate, when the flag bit is set to a first value (for example, "1"), that the third device stores angle information of the corresponding beam.

S2. The first device receives at least one beam sweep frame, and determines the first beam sweep frame and the first beam.

Implementation of this step is the same as that of step S2 in the first data frame interaction manner. For details, refer to related descriptions S3. The first device sends a first query frame (beam direction query frame) to the third device, where the first query frame carries the beam identifier of the first beam.

Specifically, after determining the first beam sweep frame and the first beam, the first device sends the first query frame to the third device, to query the angle information of the first beam from the first device. Optionally, when the flag bit in the first beam sweep frame is the first value, the first device sends the first query frame to the third device.

FIG. 7B shows a possible structure of the first query frame. As shown in the figure, the first query frame includes a frame type field, used to indicate that the frame is a query frame. The first query frame further includes a field used to indicate the first beam identifier. Optionally, the beam identifier of the first beam may be directly indicated by using a sector ID field or a beam ID field. Optionally, the beam identifier of the first beam may be indirectly indicated by using a CDOWN 1 field. For example, when a value of CDOWN 1 is "5", it indicates an order of the first beam sweep frame in all beam sweep frames sent by the third device (the first beam sweep frame is a last but five beam sweep frame sent by the third device), and the third device may learn of, based on the order of sending the beam sweep frame, the beam identifier of the first beam corresponding to the first beam sweep frame.

S4. The third device receives the first query frame, and sends a first query report frame to the first device, where the first query report frame carries the angle information of the first beam.

FIG. 7B shows a possible structure of the first query report frame. As shown in the figure, a CDOWN 1 may be used to indicate the beam identifier of the first beam, an AoD 1 field may be used to indicate a horizontal angle of the first beam, and an AoD 1 field may be used to indicate a vertical angle of the first beam.

After the foregoing steps are performed, the first device can learn of the angle information of the first beam.

Figure 7C:
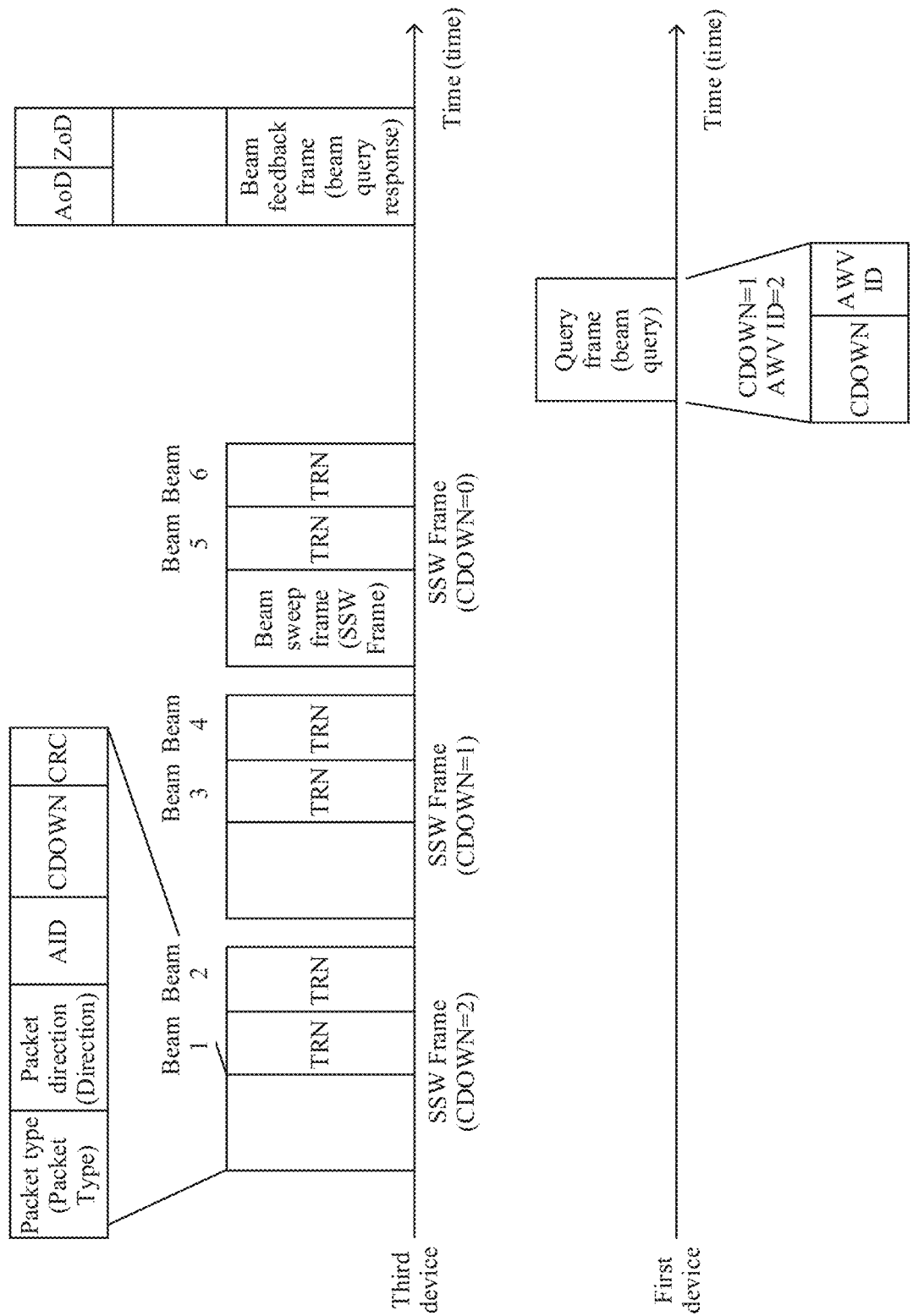
FIG. 7C is a schematic structural diagram of a beam sweep frame, a query frame, and a query report frame according to Embodiment 1 of this application.

Optionally, in the foregoing second data frame interaction manner, there is another possible form: The beam sweep frame sent by the third device to the first device includes at least one beam training signal (TRN), and each beam training signal is sent based on a different beam. Referring to FIG. 7C, the following briefly describes the process.

As shown in FIG. 7C, the third device sends a plurality of beam sweep frames to the first device, and each beam sweep frame may include a CDOWN field, to indicate a quantity of subsequent beam sweep frames. The beam sweep frame includes at least one beam training signal, and each beam training signal is sent by using a different beam. The beam sweep frame may indicate, in a Physical Layer (PHY) header or a Media Access Control (MAC) frame, a quantity of beam training signals TRN carried in the beam sweep frame. Optionally, the beam training signal TRN may alternatively be sent in a multi-spatial-stream manner. At a same moment, different streams in the plurality of spatial streams of the beam training signal TRN may be transmitted in different beam directions, and a corresponding beam query frame may further carry a spatial stream number. Optionally, a location of the beam training signal may be at an end or in the middle of a presentation protocol data unit (PPDU), or another location agreed on in a protocol.

After receiving the beam sweep frame and the beam training signal included in the beam sweep frame, and determining a received beam training signal with optimal signal quality, the first device sends a query frame (beam query) to the third device. The query frame may include a CDOWN field and an antenna weight vector (AWV) ID field, and the beam training signal with the optimal signal quality is a beam training signal indicated by the AWV ID field in the beam sweep frame indicated by the CDOWN field. The beam training signal with the optimal signal quality that is indicated by the query frame shown in FIG. 7C is a second beam training signal in a second beam sweep frame sent by the third device.

After receiving the query frame, the third device may find a corresponding beam training signal based on the query frame, add, to a beam feedback frame (beam query response), angle information of a beam that is used in sending of the beam training signal, and send the beam feedback frame to the first device.

After Implementation 1 is performed, the first device may learn of the spatial location indication information of the first device: the angle information of the first beam, and the spatial coordinates of the third device.

In an optional embodiment, the spatial location indication information of the first device in Implementation 1 may further include a transmit time of the first beam sweep frame. In the foregoing two data frame interaction manners, the first beam sweep frame may further include the transmit time of the first beam sweep frame.

It may be understood that this application is not limited to the foregoing two data frame interaction manners. During specific implementation, the spatial location indication information of the first device may be sent by different devices or a same device for a plurality of times. This is not limited in this application.

The following describes how the first device determines the transmit beam and/or the receive beam after obtaining the spatial location indication information of the first device in Implementation 1 and obtaining the spatial location indication information of the second device by using any device. Description is provided with reference to the two determining methods in step S120 in the method embodiment shown in FIG. 4.

1. First determining method: The transmit beam and/or the receive beam are/is determined based on the spatial coordinates of the first device and the spatial coordinates of the second device. With reference to the scenario diagram shown in FIG. 5, the method may include the following steps.

S1. Determine angle information of a direction in which the third device points to the first device based on the angle information of the first beam.

Specifically, in Implementation 1, the first device uses, as the first beam, a beam corresponding to a beam sweep frame whose signal quality is greater than a threshold or whose signal quality is optimal or that is earliest received. Therefore, it may be approximately considered that a direction in which the third device points to the first device is the same as a direction of the first beam. For example, when the angle information of the first beam includes a horizontal angle $\phi_b$ and an elevation angle $\theta_b$, a horizontal angle is $\phi'_1=\phi_b$ and a vertical angle is $\theta'_1=\theta_b$ in a direction in which the third device points to the first device.

S2. Determine a distance between the third device and the first device based on a signal transmit time between the first device and the third device.

Specifically, the distance $L_1$ between the third device and the first device may be estimated based on a signal transmit time $t_1$ between the third device and the first device. Optionally, $L_1=t_1 \times v$, where v is a signal transmission rate. Herein, the signal transmit time $t_1$ between the first device and the third device may be determined in the following three manners:

In a first manner, the first beam sweep frame includes a transmit time. The first device may compare the transmit time with a time point at which the first beam sweep frame is received, to obtain the signal transmit time $t_1$ between the third device and the first device.

In a second manner, the first device may send a time measurement frame to the third device after receiving the first beam sweep frame, and the third device replies to the first device after receiving the time measurement frame. The first device may estimate the signal transmit time $t_1$ between the third device and the first device based on a time difference between sending the time measurement frame and receiving the reply.

In a third manner, a transmit time of the first beam sweep frame is agreed on by the first device and the third device or is agreed on in a standard protocol. The first device may compare the transmit time with a time at which the first beam sweep frame is received, to obtain the signal transmit time $t_1$ between the third device and the first device.

S3. Determine the spatial coordinates of the first device based on the angle information of the direction in which the third device points to the first device, the distance between the third device and the first device, and the spatial coordinates of the third device.

Optionally, the spatial coordinates $(x_1, y_1, z_1)$ of the first device are determined according to the following formula. $(x_3, y_3, z_3)$ is the spatial coordinates of the third device.

$$\tan\theta_1 = \tan(360° - \theta'_1) = \frac{z_3 - z_1}{\sqrt{(x_3 - x_1)^2 + (y_3 - y_1)^2}}$$

$$\tan\phi_1 = \tan(-\phi'_1) = \frac{y_3 - y_1}{x_1 - x_3}$$

$$L = \sqrt{(x_3 - x_1)^2 + (y_3 - y_1)^2 + (z_3 - z_1)^2}$$

S4. Determine the transmit beam and/or the receive beam based on the spatial coordinates of the first device and the spatial coordinates of the second device.

Specifically, after the spatial coordinates of the device and the spatial coordinates of the second device are determined, it can be learned of a direction in which the first device points to the second device. For example, a horizontal angle $\phi$ and a vertical angle $\alpha$ in a direction in which the first device points to the second device may be learned of based on a geometric relationship.

$$\tan\theta = \frac{z_2 - z_1}{\sqrt{(x_1 - x_2)^2 + (y_1 - y_2)^2}}$$

$$\tan\phi = \frac{y_1 - y_2}{x_2 - x_1}$$

Optionally, a beam, in beams that can be formed by the first device, whose beam direction and the direction in which the first device points to the second device has an included angle that is less than a threshold may be used as the transmit beam and/or the receive beam. Herein, the transmit beam and/or the receive beam are/is used for beam training between the first device and the second device.

2. Second determining method: The transmit beam and/or the receive beam are/is determined by querying a mapping relationship table between information and the transmit beam and/or the receive beam based on the information carried in the data frame and information obtained in a process of receiving the data frame.

Specifically, there is a mapping relationship between the information carried in the data frame and the information obtained in the process of receiving the data frame (including the angle information of the first beam, the transmit time of the first beam sweep frame, the spatial coordinates of the third device, and the spatial location indication information of the second device) and the transmit beam and/or the receive beam, where the mapping relationship table may be prestored in the first device. Herein, the first device may establish the mapping relationship table based on a process in which the first device or another device determines a transmit beam and/or a receive beam in a historical period.

It may be understood that this application is not limited to the foregoing two determining methods. During specific implementation, the transmit beam and/or the receive beam of the first device may alternatively be determined in another manner in this application.

(2) Implementation 2

In Implementation 2, the spatial location indication information of the first device includes angle information of a first beam, a transmit power of a first beam sweep frame, and spatial coordinates of the third device. The first beam is a beam corresponding to the first beam sweep frame, and the first beam sweep frame is a beam sweep frame with optimal signal quality, a beam sweep frame whose signal quality is greater than a threshold, or an earliest received beam sweep frame, in beam sweep frames that are sent by the third device and that are received by the first device.

A difference from Implementation 1 lies in that the spatial location indication information of the first device in Implementation 2 further includes the transmit power of the first beam sweep frame.

The spatial coordinates of the third device are the same as those in Implementation 1. For details, refer to related descriptions. The following mainly discusses how the first device receives the data frame, to obtain information other than the spatial coordinates of the third device in the spatial location indication information of the first device, that is, the angle information of the first beam and the transmit power of the first beam sweep frame. There are two data frame interaction manners.

1. First Data Frame Interaction Manner

In the first data frame interaction manner, the data frame includes the first beam sweep frame (sector sweeping frame, SSW frame), and the first beam sweep frame carries the angle information of the first beam and the transmit power of the first beam sweep frame.

Figures 8A, 8B:
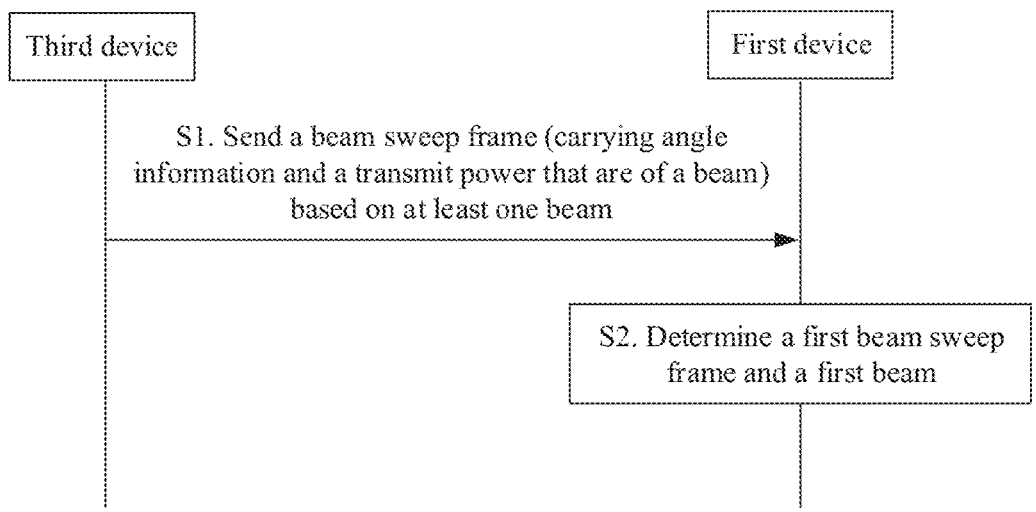

FIG. 8A is a flowchart of the first data frame interaction manner, and the following steps are included.

S1. The third device sends a beam sweep frame to the first device by using at least one beam, where the beam sweep frame carries angle information of a corresponding beam and a transmit power of the beam sweep frame.

FIG. 8B shows a possible structure of the beam sweep frame sent by the third device to the first device in the first data frame interaction manner. A transmit power field may be used to indicate a transmit power of the beam sweep frame. It may be understood that, during specific implementation, the transmit power of the beam sweep frame may alternatively be indicated by using another field. This is not limited in this application.

S2. The first device receives at least one beam sweep frame, and determines the first beam sweep frame and the first beam.

It may be understood that implementation of steps S1 and S2 is similar to that in FIG. 6A. For details, refer to related descriptions.

After the foregoing steps are performed, the first device can learn of the angle information of the first beam and the transmit power.

2. Second Data Frame Interaction Manner

In the second data frame interaction manner, the data frame includes the first beam sweep frame (SSW frame) and a first query report frame (beam direction announcement), where the first beam sweep frame carries a beam identifier of the first beam and the transmit power of the first beam sweep frame, and the first query report frame carries the angle information of the first beam.

Figures 9A, 9B:
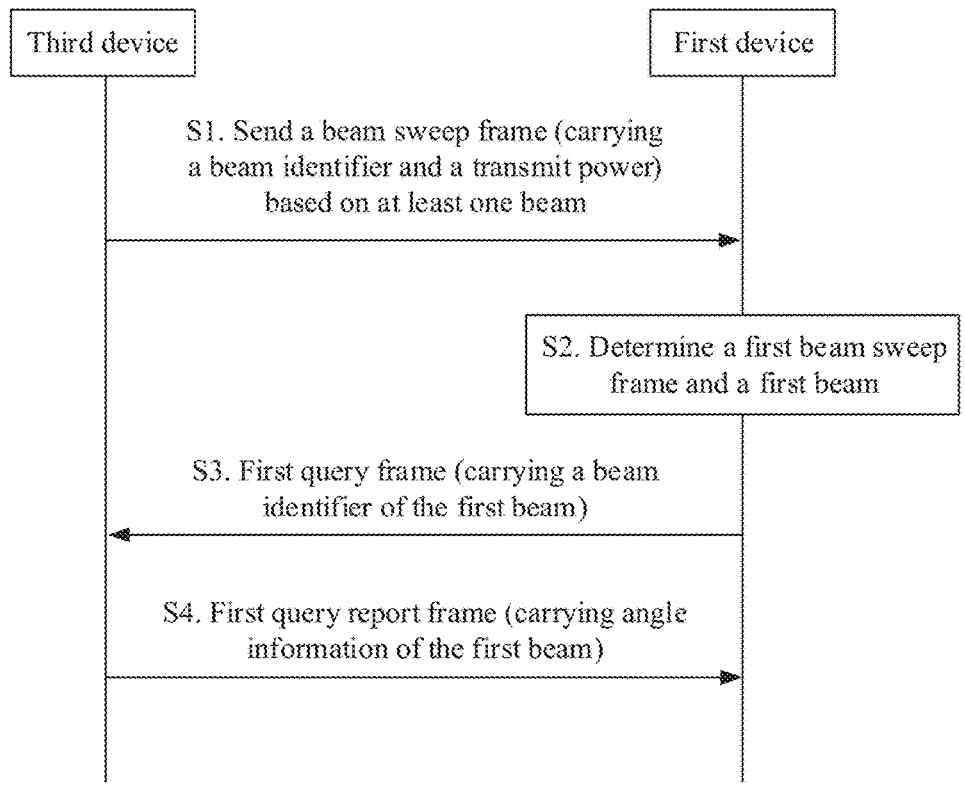

A difference between the second data frame interaction manner and the first data frame interaction manner lies in that the angle information of the first beam and the transmit power of the first beam sweep frame are separately sent by the third device. FIG. 9A is a flowchart of the second data frame interaction manner, and the following steps are included.

S1. The third device sends a beam sweep frame (SSW frame) to the first device by using at least one beam, where the beam sweep frame carries a beam identifier of a corresponding beam and a transmit power of the beam sweep frame.

Specifically, the third device controls, by using a beamforming technology, an antenna array to form the at least one beam, and sends the beam sweep frame to the first device by using the at least one beam. FIG. 9B shows a possible structure of the beam sweep frame sent by the third device to the first device in the second data frame interaction manner. As shown in the figure, a CDOWN field, a sector ID field, or a beam ID field may be used to indicate the beam identifier of the beam corresponding to the beam sweep frame, and a transmit power field or the like may be used to indicate the transmit power of the beam sweep frame.

S2. The first device receives at least one beam sweep frame, and determines the first beam sweep frame and the first beam.

S3. The first device sends a first query frame (beam direction query) to the third device, where the first query frame carries the beam identifier of the first beam.

Herein, a structure of the first query frame is the same as that in FIG. 7B. For details, refer to related descriptions.

S4. The third device receives the first query frame, and sends a first query report frame to the first device, where the first query report frame carries the angle information of the first beam.

Herein, a structure of the first query report frame is the same as that in FIG. 7B. For details, refer to related descriptions.

After the foregoing steps are performed, the first device can learn of the angle information of the first beam and the transmit power.

It may be understood that, in the foregoing second data frame interaction manner, there is another possible implementation. The implementation is similar to that in FIG. 7C. For details, refer to FIG. 7C and related descriptions of the foregoing second data frame interaction manner. Details are not described herein again.

After Implementation 2 is performed, the first device may learn of the spatial location indication information of the first device: the angle information of the first beam, the transmit power of the first beam sweep frame, and the spatial coordinates of the third device.

In an optional embodiment, the spatial location indication information of the first device in Implementation 2 may further include a transmit time of the first beam sweep frame. In the foregoing two data frame interaction manners, the first beam sweep frame may further include the transmit time of the first beam sweep frame.

It may be understood that this application is not limited to the foregoing two data frame interaction manners. During specific implementation, the spatial location indication information of the first device may be sent by different devices or a same device for a plurality of times. This is not limited in this application.

The following describes how the first device determines the transmit beam and/or the receive beam after obtaining the spatial location indication information of the first device in Implementation 2 and obtaining the spatial location indication information of the second device by using any device. Description is provided with reference to the two determining methods in step S120 in the method embodiment shown in FIG. 4.

1. First determining method: The transmit beam and/or the receive beam are/is determined based on the spatial coordinates of the first device and the spatial coordinates of the second device. With reference to the scenario diagram shown in FIG. 5, the method may include the following steps.

S1. Determine angle information of a direction in which the third device points to the first device based on the angle information of the first beam and the transmit power of the first beam sweep frame.

First, the first device determines, based on the transmit power, a deviation angle between the direction in which the third device points to the first device and the first beam.

Specifically, all devices in a sector coverage area of the first beam can receive the first beam sweep frame. However, devices at different locations receive the first beam sweep frame at different receive powers, and a device closer to a main lobe direction of the first beam has higher receive power. An included angle between the direction in which the third device actually points to the device and the first beam may be referred to as the deviation angle, and there is a positive correlation between the deviation angle and a power loss.

Figure 10:
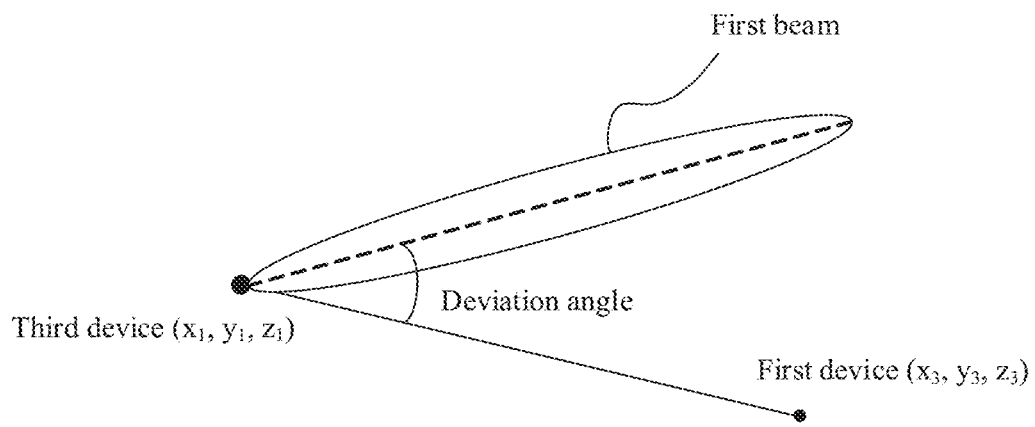
FIG. 10 is a schematic diagram of a deviation angle according to this application.

After receiving the first beam sweep frame, the first device may compare a receive power with the transmit power that is carried in the first beam sweep frame, to determine the power loss; and determine, based on the mapping relationship between the power loss and the deviation angle, the deviation angle between the direction in which the third device actually points to the first device and the first beam, that is, an included angle between the direction in which the third device actually points to the first device and the main lobe direction of the first beam. FIG. 10 is a schematic diagram of the deviation angle.

Then, the first device determines, based on the deviation angle and the angle information of the first beam, angle information of the direction in which the third device points to the first device, where the angle information includes at least one of a horizontal angle $\phi'_1$ and an elevation angle $\theta'_1$.

S2. Determine a distance between the third device and the first device based on a signal transmit time between the first device and the third device.

S3. Determine the spatial coordinates of the first device based on the angle information of the direction in which the third device points to the first device, the distance between the third device and the first device, and spatial coordinates of the third device.

S4. Determine the transmit beam and/or the receive beam based on the spatial coordinates of the first device and the spatial coordinates of the second device.

It may be understood that implementation of steps S2 to S4 is the same as the first determining method in implementation 1. For details, refer to related descriptions.

2. Second determining method: The transmit beam and/or the receive beam are/is determined by querying a mapping relationship table between information and the transmit beam and/or the receive beam based on the information carried in the data frame and information obtained in a process of receiving the data frame.

Specifically, there is a mapping relationship between the information carried in the data frame and the information obtained in the process of receiving the data frame (including the angle information of the first beam, the transmit time and the transmit power of the first beam sweep frame, the spatial coordinates of the third device, and the spatial location indication information of the second device) and the transmit beam and/or the receive beam, where the mapping relationship table may be prestored in the first device.

It may be understood that this application is not limited to the foregoing two determining methods. During specific implementation, the transmit beam and/or the receive beam of the first device may alternatively be determined in another manner in this application.

(3) Implementation 3

In Implementation 3, the spatial location indication information of the first device includes angle information of a second beam, a transmit power of a second beam sweep frame, a beam identifier of the second beam, a beam identifier of a third beam, and spatial coordinates of the third device. The second beam is a beam corresponding to the second beam sweep frame, the third beam is a beam corresponding to a third beam sweep frame, and the second beam sweep frame and the third beam sweep frame are sent by the third device to the first device.

The spatial coordinates of the third device are the same as those in Implementation 1. For details, refer to related descriptions. The following mainly discusses how the first device receives the data frame, to obtain information other than the spatial coordinates of the third device in the spatial location indication information of the first device, that is, the angle information of the second beam, the transmit power of the second beam sweep frame, the beam identifier of the second beam, and the beam identifier of the third beam. There are two data frame interaction manners.

1. First Data Frame Interaction Manner

In the first data frame interaction manner, the data frame includes the second beam sweep frame (sector sweeping frame, SSW frame) and the third beam sweep frame, the second beam sweep frame carries the angle information of the second beam, the transmit power of the second beam sweep frame, and the beam identifier of the second beam, and the third beam sweep frame carries the beam identifier of the third beam.

Figure 11A:
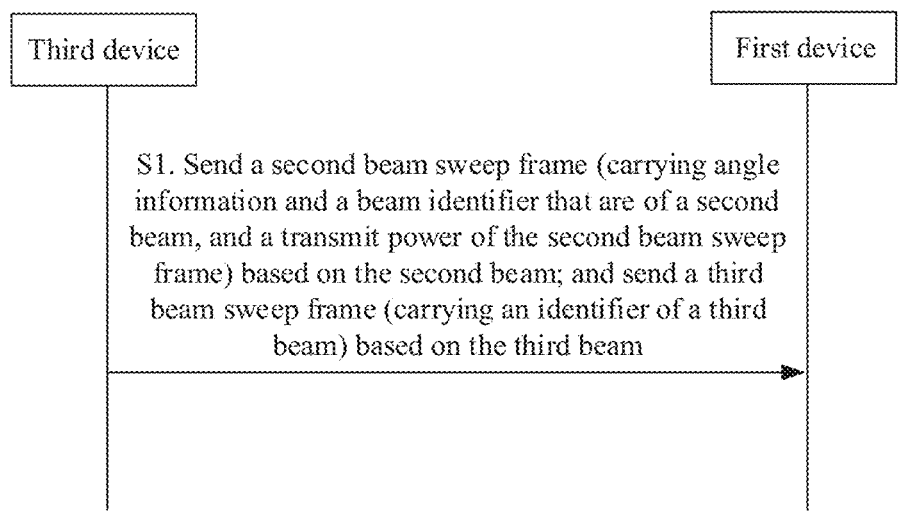

FIG. 11A is a flowchart of the first data frame interaction manner, and the following steps are included.

S1. The third device sends the second beam sweep frame to the first device by using the second beam, and sends the third beam sweep frame to the first device by using the third beam.

The second beam sweep frame carries the angle information of the second beam, the transmit power of the second beam sweep frame, and the beam identifier of the second beam. The third beam sweep frame carries the beam identifier of the third beam. Herein, the second beam and the third beam are different beams, and the second beam and the third beam may be any two beams formed by controlling, by the third device by using the beamforming technology, an antenna array.

FIG. 11B shows a possible structure of the second beam sweep frame and the third beam sweep frame in the first data frame interaction manner.

2. Second Data Frame Interaction Manner

In the second data frame interaction manner, the data frame includes the second beam sweep frame (SSW frame), a second query report frame (beam direction announcement), and the third beam sweep frame. The second beam sweep frame carries the beam identifier of the second beam and the transmit power of the second beam sweep frame. The second query report frame carries the angle information of the second beam. The third beam sweep frame carries the beam identifier of the third beam.

Figures 12A, 12B:
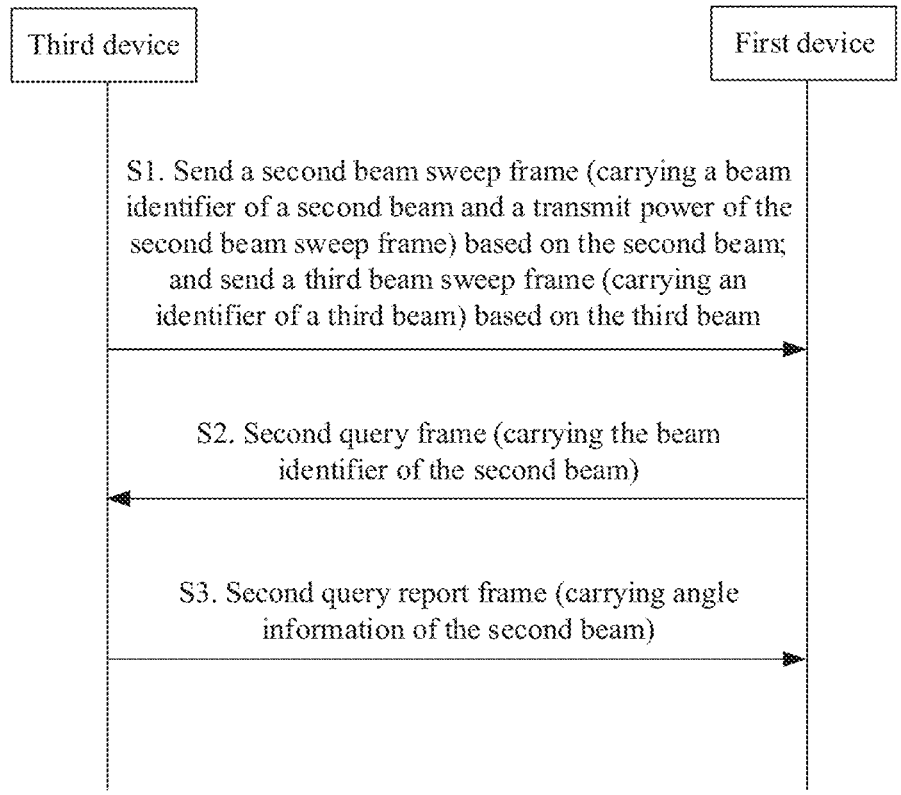

A difference between the second data frame interaction manner and the first data frame interaction manner lies in that the angle information of the first beam, the transmit power of the second beam sweep frame, and the beam identifier of the second beam are separately sent by the third device. FIG. 12A is a flowchart of the second data frame interaction manner, and the following steps are included.

S1. The third device sends the second beam sweep frame to the first device by using the second beam, and sends the third beam sweep frame to the first device by using the third beam.

The second beam sweep frame carries the transmit power of the second beam sweep frame and the beam identifier of the second beam. The third beam sweep frame carries the beam identifier of the third beam. Herein, the second beam and the third beam are different beams, and the second beam and the third beam may be any two beams formed by controlling, by the third device by using the beamforming technology, an antenna array.

FIG. 12B shows a possible structure of the second beam sweep frame and the third beam sweep frame in the second data frame interaction manner.

S2. The first device sends a second query frame (beam direction query) to the third device, where the second query frame carries the beam identifier of the second beam.

S3. The third device receives the second query frame, and sends a second query report frame to the first device, where the second query report frame carries the angle information of the second beam.

It may be understood that implementation of steps S2 and S3 is the same as the second data frame interaction manner in Implementation 1. For details, refer to related descriptions. Herein, for structures of the second query frame and the second query report frame, refer to those of the first query frame and the first query report frame, and related descriptions shown in FIG. 7B.

After the foregoing steps are performed, the first device can learn of the angle information of the second beam, the transmit power of the second beam sweep frame, the identifier of the second beam, and the identifier of the third beam.

It may be understood that, in the foregoing second data frame interaction manner, there is another possible implementation. The implementation is similar to that in FIG. 7C. For details, refer to FIG. 7C and related descriptions of the foregoing second data frame interaction manner. Details are not described herein again.

After Implementation 3 is performed, the first device may learn of the spatial location indication information of the first device: the angle information of the second beam, the transmit power of the second beam sweep frame, the beam identifier of the second beam, the beam identifier of the third beam, and the spatial coordinates of the third device.

It may be understood that this application is not limited to the foregoing two data frame interaction manners. During specific implementation, the spatial location indication information of the first device may be sent by different devices or a same device for a plurality of times. This is not limited in this application.

The following describes how the first device determines the transmit beam and/or the receive beam after obtaining the spatial location indication information of the first device in Implementation 3 and obtaining the spatial location indication information of the second device by using any device. Description is provided with reference to the two determining methods in step S120 in the method embodiment shown in FIG. 4.

1. First determining method: The transmit beam and/or the receive beam are/is determined based on the spatial coordinates of the first device and the spatial coordinates of the second device. With reference to the scenario diagram shown in FIG. 5, the method may include the following steps.

S1. Determine angle information of a direction in which the third device points to the first device based on the beam identifier of the second beam, the beam identifier of the third beam, and the angle information of the second beam.

First, the first device determines, based on the beam identifier of the second beam and the beam identifier of the third beam, a deviation angle between the direction in which the third device points to the first device and the second beam.

Specifically, there is a difference between a power of the second beam sweep frame and a power of the third beam sweep frame that are received by any device in a sector coverage area of the second beam and a sector coverage area of the third beam, and the difference may be referred to as a gain difference. There is an association relationship between the gain difference and deviation angles of the device relative to the two beams. Herein, the association relationship between the gain difference and the deviation angle may be determined and stored by the first device based on beam widths of the second beam and the third beam. The beam widths of the second beam and the third beam may be sent by the third device to the first device, or may be obtained by the first device from a network or another device.

After receiving the second beam sweep frame and the third beam sweep frame, the first device determines a gain difference between the second beam sweep frame and the third beam sweep frame based on a receive power, and may determine, based on an association relationship between the gain difference and a deviation angle, the deviation angle between the direction in which the third device actually points to the first device and the second beam.

Then, the first device determines, based on the deviation angle and the angle information of the second beam, angle information of the direction in which the third device points to the first device, where the angle information includes at least one of a horizontal angle $\phi'_1$ and an elevation angle $\theta'_1$.

S2. Determine a distance between the third device and the first device based on the transmit power of the second beam sweep frame.

Specifically, within coverage of the second beam, a device farther away from the third device receives a lower power of the second beam sweep frame with a higher power loss. Therefore, the distance between the third device and the first device is positively correlated with the power loss of the second beam sweep frame. Herein, the mapping relationship between a distance and a power loss may be prestored by the first device.

After receiving the second beam sweep frame, the first device may compare a receive power with the transmit power that is carried in the second beam sweep frame, to determine the power loss; and determine the distance between the third device and the first device based on the mapping relationship between the power loss and the distance.

S3. Determine the spatial coordinates of the first device based on the angle information of the direction in which the third device points to the first device, the distance between the third device and the first device, and the spatial coordinates of the third device.

S4. Determine the transmit beam and/or the receive beam based on the spatial coordinates of the first device and the spatial coordinates of the second device.

It may be understood that implementation of steps S3 and S4 is the same as the first determining method in Implementation 1. For details, refer to related descriptions.

2. Second determining method: The transmit beam and/or the receive beam are/is determined by querying a mapping relationship table between information carried in the data frame and the transmit beam and/or the receive beam based on the information carried in the data frame.

Specifically, there is a mapping relationship between the information carried in the data frame (including the angle information of the second beam, the transmit power of the second beam sweep frame, the beam identifier of the second beam, the beam identifier of the third beam, the spatial coordinates of the third device, and the spatial location indication information of the second device) and the transmit beam and/or the receive beam, where the mapping relationship may be prestored in the first device.

It may be understood that this application is not limited to the foregoing two determining methods. During specific implementation, the transmit beam and/or the receive beam of the first device may alternatively be determined in another manner in this application.

(4) Implementation 4

In Implementation 4, the spatial location indication information of the first device includes a beam identifier of a fourth beam and spatial coordinates of the third device. The fourth beam is a beam corresponding to a fourth beam sweep frame, and the fourth beam sweep frame is a beam sweep frame with optimal signal quality, a beam sweep frame whose signal quality is greater than a threshold, or an earliest received beam sweep frame, in beam sweep frames that are sent by the first device and that are received by the third device.

The spatial coordinates of the third device are the same as those in Implementation 1. For details, refer to related descriptions. The following mainly discusses how the first device receives the data frame, to obtain information other than the spatial coordinates of the third device in the spatial location indication information of the first device, that is, the beam identifier of the fourth beam.

In this implementation, the data frame includes a first beam feedback frame (sector sweeping feedback frame, SSW feedback frame), and the first beam feedback frame carries the beam identifier of the fourth beam.

Figures 13A, 13B:
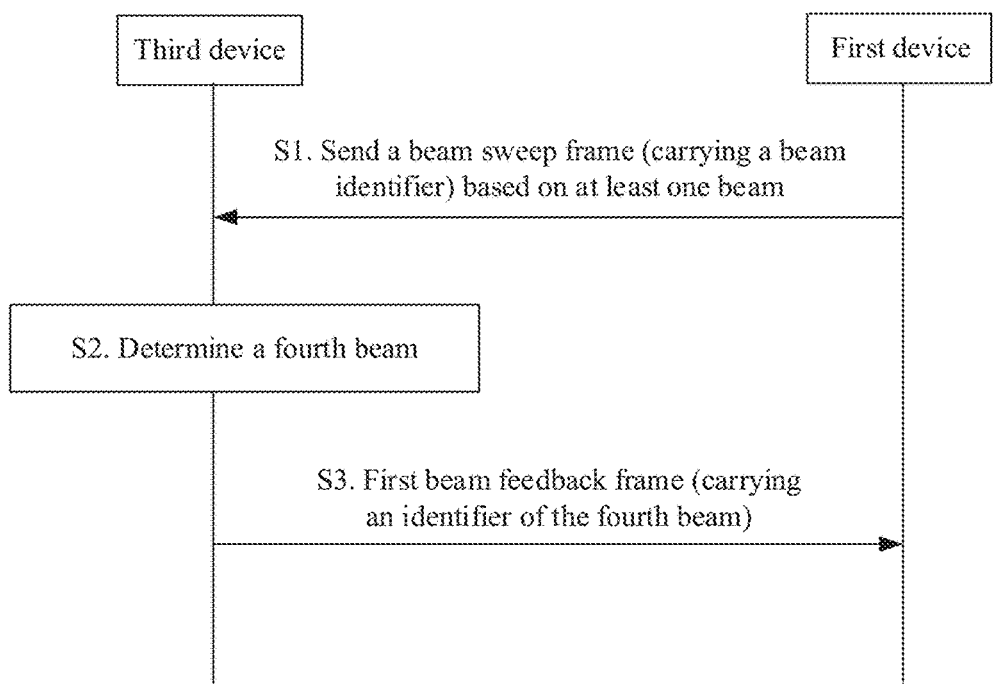

Referring to FIG. 13A, a data frame interaction manner in this implementation may include the following steps.

S1. The first device sends a beam sweep frame to the third device by using at least one beam, where the beam sweep frame carries a beam identifier of a corresponding beam.

Specifically, the first device controls, by using a beamforming technology, an antenna array to form the at least one beam, and sends the beam sweep frame to the third device by using the at least one beam.

S2. The third device receives at least one beam sweep frame, and determines the fourth beam sweep frame and the fourth beam.

Optionally, the third device may select a beam sweep frame with optimal signal quality as the fourth beam sweep frame, and a corresponding beam used by the first device to transmit the fourth beam sweep frame is used as the fourth beam.

Optionally, the third device may select any beam sweep frame whose signal quality is greater than a threshold as the fourth beam sweep frame, and a corresponding beam used by the first device to transmit the fourth beam sweep frame is used as the fourth beam.

Optionally, the third device may select an earliest received beam sweep frame as the fourth beam sweep frame, and a corresponding beam used by the first device to transmit the fourth beam sweep frame is used as the fourth beam.

S3. The third device sends the first beam feedback frame to the first device, where the first beam feedback frame carries the beam identifier of the fourth beam.

FIG. 13B shows a possible structure of the first beam feedback frame. A CDOWN field, a sector ID field, a beam ID field, or the like may be used to indicate the beam identifier of the fourth beam.

After the foregoing steps are performed, the first device can learn of the beam identifier of the fourth beam.

It may be understood that, in the foregoing second data frame interaction manner, there is another possible implementation. The implementation is similar to that in FIG. 7C. For details, refer to FIG. 7C and related descriptions of the foregoing second data frame interaction manner. Details are not described herein again.

After Implementation 4 is performed, the first device may learn of the spatial location indication information of the first device: the beam identifier of the fourth beam and the spatial coordinates of the third device.

It may be understood that this application is not limited to the foregoing data frame interaction manners. During specific implementation, the spatial location indication information of the first device may be sent by different devices or a same device for a plurality of times. This is not limited in this application.

The following describes how the first device determines the transmit beam and/or the receive beam after obtaining the spatial location indication information of the first device in Implementation 4 and obtaining the spatial location indication information of the second device by using any device. Description is provided with reference to the two determining methods in step S120 in the method embodiment shown in FIG. 4.

1. First determining method: The transmit beam and/or the receive beam are/is determined based on the spatial coordinates of the first device and the spatial coordinates of the second device. The method may include the following steps.

S1. The first device determines, based on the beam identifier of the fourth beam, angle information of a direction in which the first device points to the third device.

First, the first device may query, based on the beam identifier of the fourth beam, a beam corresponding to the beam identifier from beams that can be formed by the first device, and learn of angle information of the beam (that is, the fourth beam).

Specifically, the beam fed back by the third device to the first device by using the first beam feedback frame in implementation 4 is a beam corresponding to a beam sweep frame whose signal quality is greater than a threshold or whose signal quality is optimal or that is earliest received. Therefore, it may be approximately considered that the direction in which the first device points to the third device is the same as a direction of a beam corresponding to the beam sweep frame. In other words, the angle information of the direction in which the first device points to the third device is the same as the angle information of the beam (that is, the fourth beam) queried by the first device.

Because there is an association relationship between angle information of beams in opposite directions (referring to FIG. 5 and related descriptions), angle information of a direction in which the third device points to the first device may be determined based on the angle information of the direction in which the first device points to the third device, where the angle information includes at least one of a horizontal angle $\phi'_1$ and an elevation angle $\theta'_1$.

S2. The first device determines a distance between the first device and the third device.

Specifically, the first device estimates the distance between the third device and the first device $L_2$ based on a time difference t2 between sending the beam sweep frame and receiving the first beam feedback frame in steps S1 and S4 in the data frame interaction procedure in FIG. 13A. Optionally, $L_2=t_2 \times v$, where v is a signal transmission rate.

S3. Determine the spatial coordinates of the first device based on the angle information of the direction in which the first device points to the third device, the distance between the first device and the third device, and the spatial coordinates of the third device.

S4. Determine the transmit beam and/or the receive beam based on the spatial coordinates of the first device and the spatial coordinates of the second device.

It may be understood that implementation of steps S3 and S4 is similar to the first determining method in Implementation 1. For details, refer to related descriptions.

2. Second determining method: The transmit beam and/or the receive beam are/is determined by querying a mapping relationship table between information and the transmit beam and/or the receive beam based on the information carried in the data frame and information obtained in a process of receiving the data frame.

Specifically, there is a mapping relationship between the information (including at least the beam identifier of the fourth beam, the spatial coordinates of the third device, the spatial location indication information of the second device, and the time difference between sending the beam sweep frame and receiving the first beam feedback frame) and the transmit beam and/or the receive beam, where the mapping relationship may be prestored in the first device.

It may be understood that this application is not limited to the foregoing two determining methods. During specific implementation, the transmit beam and/or the receive beam of the first device may alternatively be determined in another manner in this application.

2. Embodiment 2

Figure 14:
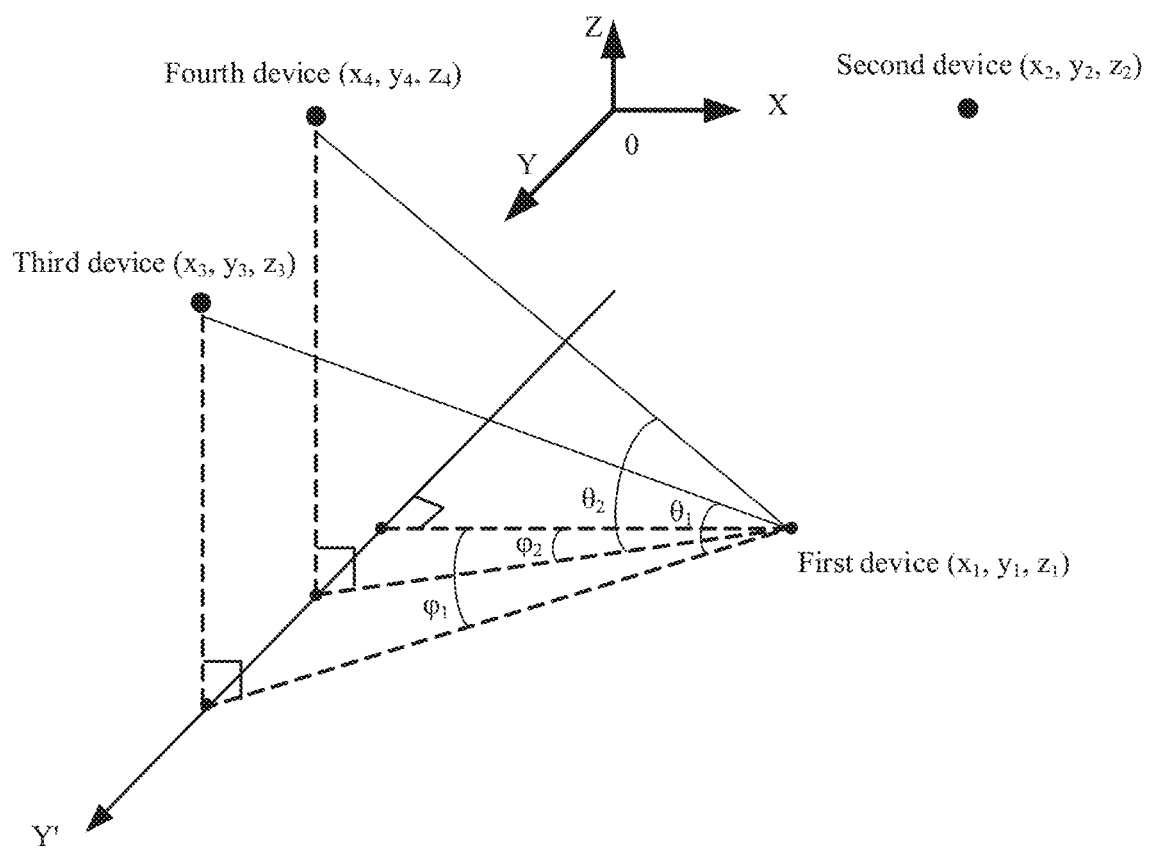
FIG. 14 is a schematic scenario diagram of a first device, a second device, a third device, and a fourth device according to Embodiment 2 of this application.

In this embodiment, a first device obtains spatial location indication information of the first device through a third device and a fourth device. There may be a connection relationship (a wireless connection or a wired connection) between the first device and each of the third device and the fourth device, or there may be no connection relationship between the first device and each of the third device and the fourth device. For example, the first device is a terminal, and the third device and the fourth device may be APs accessed by the first device. FIG. 14 is a schematic scenario diagram of a first device, a second device, a third device, and a fourth device.

In this embodiment, the spatial location indication information of the first device may include two parts. One part is related to the third device, and the other part is related to the fourth device. The following describes the two parts in detail.

The information related to the third device may include any one of the following:

(1) Angle information of a first beam and spatial coordinates of the third device.

(2) Angle information of a first beam, a transmit power of a first beam sweep frame, and spatial coordinates of the third device.

(3) Angle information of a second beam, a beam identifier of the second beam, a beam identifier of a third beam, and spatial coordinates of the third device.

(4) A beam identifier of a fourth beam and spatial coordinates of the third device.

The first beam is a beam corresponding to the first beam sweep frame, and the first beam sweep frame is a beam sweep frame with optimal signal quality, a beam sweep frame whose signal quality is greater than a threshold, or an earliest received beam sweep frame, in beam sweep frames that are sent by the third device and that are received by the first device.

The second beam is a beam corresponding to a second beam sweep frame, the third beam is a beam corresponding to a third beam sweep frame, and the second beam sweep frame and the third beam sweep frame are sent by the third device to the first device.

The fourth beam is a beam corresponding to a fourth beam sweep frame, and the fourth beam sweep frame is a beam sweep frame with optimal signal quality, a beam sweep frame whose signal quality is greater than a threshold, or an earliest received beam sweep frame, in beam sweep frames that are sent by the first device and that are received by the third device.

It may be understood that, a process in which the first device receives the data frame to obtain the information related to the third device in the spatial location indication information of the first device is the same as that in Implementation 1 to Implementation 4 in Embodiment 1. For details, refer to related descriptions.

The information related to the fourth device may include any one of the following:

(1) Angle information of a fifth beam and spatial coordinates of the fourth device.

(2) Angle information of a fifth beam, a transmit power of a fifth beam sweep frame, and spatial coordinates of the fourth device.

(3) Angle information of a sixth beam, a beam identifier of the sixth beam, a beam identifier of a seventh beam, and spatial coordinates of the fourth device.

(4) A beam identifier of an eighth beam and spatial coordinates of the fourth device.

The fifth beam is a beam corresponding to the fifth beam sweep frame, and the fifth beam sweep frame is a beam sweep frame with optimal signal quality, a beam sweep frame whose signal quality is greater than a threshold, or an earliest received beam sweep frame, in beam sweep frames that are sent by the fourth device and that are received by the first device.

The sixth beam is a beam corresponding to a sixth beam sweep frame, the seventh beam is a beam corresponding to a seventh beam sweep frame, and the sixth beam sweep frame and the seventh beam sweep frame are sent by the fourth device to the first device.

The eighth beam is a beam corresponding to an eighth beam sweep frame, and the eighth beam sweep frame is a beam sweep frame with optimal signal quality, a beam sweep frame whose signal quality is greater than a threshold, or an earliest received beam sweep frame, in beam sweep frames that are sent by the first device and that are received by the fourth device.

It may be understood that, a process in which the first device receives the data frame to obtain the information related to the fourth device in the spatial location indication information of the first device is similar to that in Implementation 1 to Implementation 4 in Embodiment 1. For details, refer to related descriptions.

It may be understood that, in this embodiment, in the spatial location indication information of the first device, the foregoing two types of information: the information related to the third device, and the information related to and the fourth device may be randomly combined. That is, in this embodiment, there are at least 16 implementations for the spatial location indication information of the first device.

The following lists two possible data frame interaction manners.

1. The data frame interaction manner is described by using an example in which the spatial location indication information of the first device includes the type (1) of the information related to the third device, and the type (1) of the information related to the fourth device, that is, by using an example in which the spatial location indication information of the first device includes the angle information of the first beam, the angle information of the fifth beam, the spatial coordinates of the third device, and the spatial coordinates of the fourth device.

Figure 15:
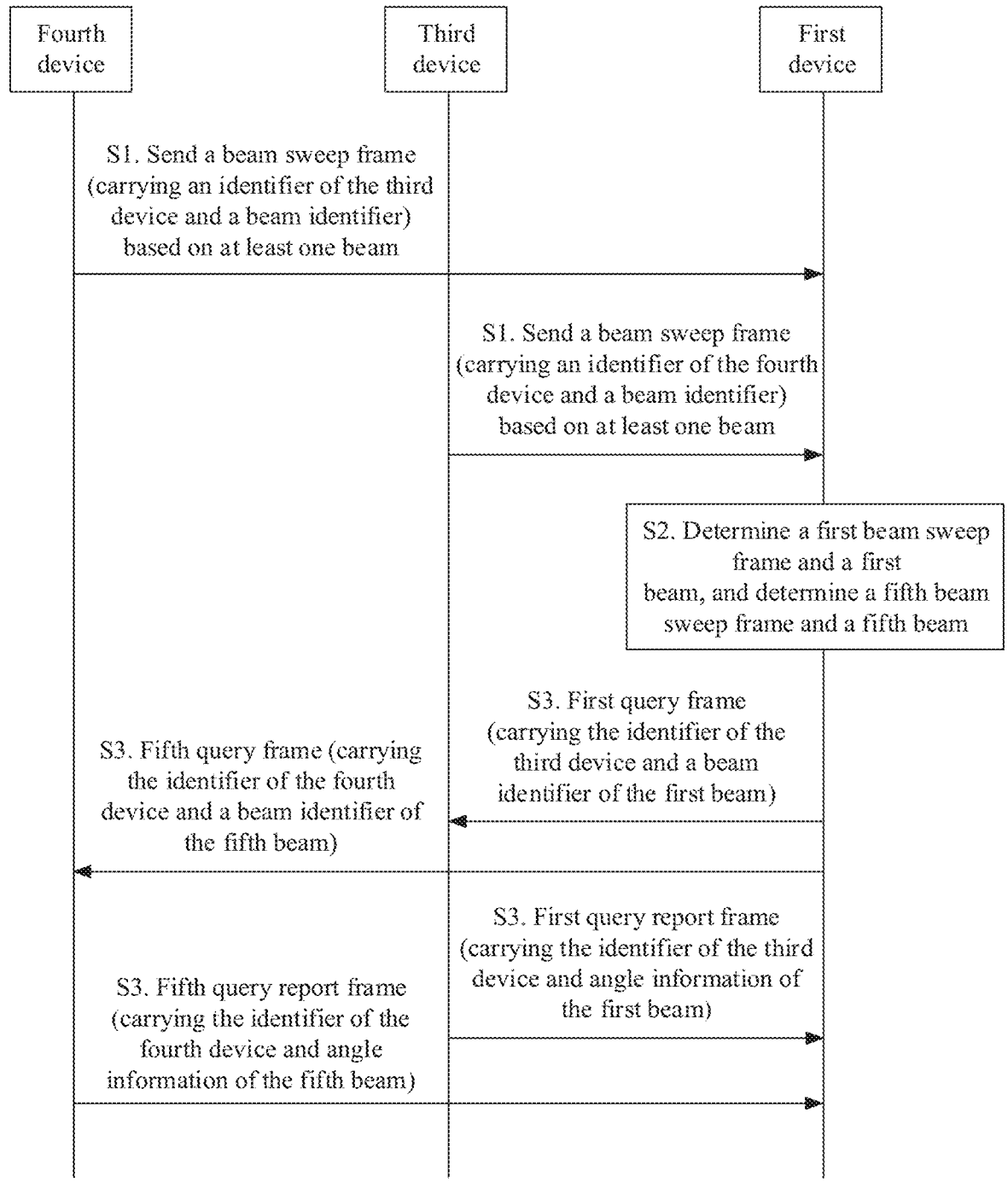
FIG. 15 and FIG. 16 are flowcharts of data frame interaction according to Embodiment 2 of this application.

Herein, a manner of receiving the spatial coordinates of the third device and the spatial coordinates of the fourth device is the same as the manner of receiving the spatial coordinates of the third device in Embodiment 1. For details, refer to related descriptions. The following mainly discusses how the first device receives the data frame, to obtain information other than the spatial coordinates of the third device and the spatial coordinates of the fourth device in the spatial location indication information of the first device. Referring to FIG. 15, the data frame interaction manner may include the following steps.

S1. The third device sends a beam sweep frame to the first device by using at least one beam, where the beam sweep frame carries an identifier of the third device and a beam identifier of a corresponding beam; and the fourth device sends a beam sweep frame to the first device by using at least one beam, where the beam sweep frame carries an identifier of the fourth device and a beam identifier of a corresponding beam.

Herein, the beam sweep frame carries a device identifier used to indicate to the first device that the beam sweep frame is sent by the third device or the fourth device.

S2. The first device receives at least one beam sweep frame sent by the third device, and determines a first beam sweep frame and the first beam; and the first device receives at least one beam sweep frame sent by the fourth device, and determines a fifth beam sweep frame and the fifth beam.

Herein, an operation of determining the first beam sweep frame and the first beam by the first device, and an operation of determining the fifth beam sweep frame and the fifth beam by the fourth device are the same as step S2 in the first data frame interaction manner in Implementation 1 of Embodiment 1. For details, refer to related descriptions.

S3. The first device sends a first query frame to the third device, where the first query frame carries the identifier of the third device and the beam identifier of the first beam; and the first device sends a fifth query frame to the fourth device, where the fifth query frame carries the identifier of the fourth device and the beam identifier of the fifth beam.

Herein, the first query frame carries the identifier of the third device, used to indicate that the first query frame is sent by the first device to the third device. Similarly, the fifth query frame carries the identifier of the fourth device, used to indicate that the fifth query frame is sent by the first device to the fourth device.

S4. The third device receives the first query frame, and sends a first query report frame to the first device, where the first query report frame carries the identifier of the third device and the angle information of the first beam; and the fourth device receives the fifth query frame, and sends a fifth query report frame to the first device, where the fifth query report frame carries the identifier of the fourth device and the angle information of the fifth beam.

Herein, the first query report frame carries the identifier of the third device, used to indicate that the first query report frame is sent by the third device to the first device. Similarly, the fifth query report frame carries the identifier of the fourth device, used to indicate that the fifth query report frame is sent by the fourth device to the first device.

2. The data frame interaction manner is described by using an example in which the spatial location indication information of the first device includes the type (4) of the information related to the third device, and the type (4) of the information related to the fourth device, that is, by using an example in which the spatial location indication information of the first device includes the beam identifier of the fourth beam, the beam identifier of the eighth beam, the spatial coordinates of the third device, and the spatial coordinates of the fourth device.

Figure 16:
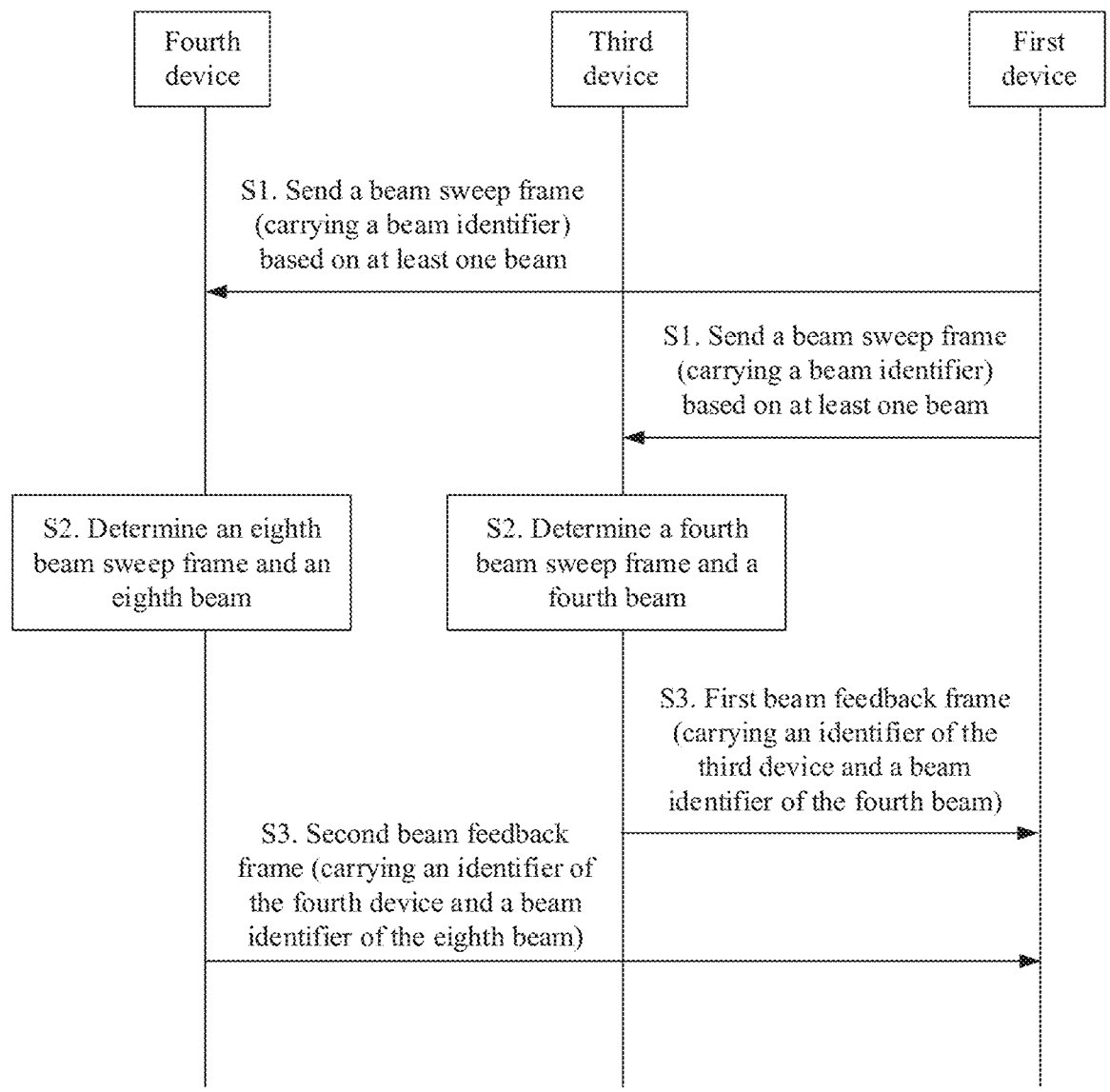

Herein, a manner of receiving the spatial coordinates of the third device and the spatial coordinates of the fourth device is the same as the manner of receiving the spatial coordinates of the third device in Embodiment 1. For details, refer to related descriptions. The following mainly discusses how the first device receives the data frame, to obtain information other than the spatial coordinates of the third device and the spatial coordinates of the fourth device in the spatial location indication information of the first device. Referring to FIG. 16, the following steps may be included.

S1. The first device sends a beam sweep frame to the third device by using at least one beam, and sends a beam sweep frame to the fourth device by using the at least one beam, where: the beam sweep frame carries a beam identifier of a corresponding beam.

S2. The third device receives at least one beam sweep frame sent by the first device, and determines a fourth beam sweep frame and the fourth beam; and the fourth device receives at least one beam sweep frame sent by the first device, and determines an eighth beam sweep frame and the eighth beam.

Herein, an operation of determining the fourth beam by the third device and an operation of determining the eighth beam by the fourth device are the same as step S2 in the first data frame interaction manner in implementation 1 of Embodiment 1. For details, refer to related descriptions.

S3. The third device sends a first beam feedback frame to the first device, where the first beam feedback frame carries an identifier of the third device and the beam identifier of the fourth beam; and the fourth device sends a second beam feedback frame to the first device, where the second beam feedback frame carries an identifier of the fourth device and the beam identifier of the eighth beam.

Herein, the first beam feedback frame carries the identifier of the third device, used to indicate that the first beam feedback frame is sent by the third device to the first device. Similarly, the second beam feedback frame carries the identifier of the fourth device, used to indicate that the second beam feedback frame is sent by the fourth device to the first device.

It may be understood that this application is not limited to the foregoing two data frame interaction manners. During specific implementation, the spatial location indication information of the first device may be sent by different devices or a same device for a plurality of times. This is not limited in this application.

It may be understood that the foregoing two data frame interaction manners are merely examples. During specific implementation, in the spatial location indication information of the first device, the information related to the third device and the information related to the fourth device may be randomly combined. For an implementation of each combination and a data frame interaction manner, refer to related descriptions in Embodiment 1. Details are not described herein again.

The following describes how the first device determines the transmit beam and/or the receive beam after obtaining the spatial location indication information of the first device in Embodiment 2 and obtaining the spatial location indication information of the second device by using any device. Description is provided with reference to the two determining methods in step S120 in the method embodiment shown in FIG. 4.

1. First determining method: The transmit beam and/or the receive beam are/is determined based on the spatial coordinates of the first device and the spatial coordinates of the second device. With reference to the scenario diagram shown in FIG. 14, the method may include the following steps.

S1. The first device determines angle information of a direction in which the first device points to the third device, and determines angle information of a direction in which the first device points to the fourth device.

Specifically, the first device may determine, based on the information related to the third device in the spatial location indication information of the first device, the angle information of the direction in which the first device points to the third device.

Because there are a plurality of implementations for the information related to the third device, correspondingly, there are a plurality of determining methods. When the information related to the third device is the foregoing type (1) to the type (3) of information, the angle information of the direction in which the third device points to the first device may be determined based on step 1 of the first determining method in implementation 1 to Implementation 3 of Embodiment 1, and then the angle information of the direction in which the first device points to the third device is determined based on the association relationship between angle information of beams in opposite directions. When the information related to the third device is the foregoing type (4) of information, the angle information of the direction in which the first device determines to point to the third device may be determined according to step 1 of the first determining method in Implementation 4 of Embodiment 1. For details, refer to related descriptions.

Specifically, the first device may determine, based on the information related to the fourth device in the spatial location indication information of the first device, the angle information of the direction in which the first device points to the fourth device. Herein, a method for determining the angle information of the direction in which the first device points to the fourth device is similar to a method for determining the angle information of the direction in which the first device points to the third device. For details, refer to related descriptions.

S2. Determine the spatial coordinates of the first device based on the angle information of the direction in which the first device points to the third device and the angle information of the direction in which the first device points to the fourth device.

Optionally, the spatial coordinates $(x_1, y_1, z_1)$ of the first device are determined according to the following formula.

$$\tan\theta_2 = \frac{z_4 - z_3}{\sqrt{x_1^2 + (y_1 - y_4)^2}}$$

$$\tan\theta_1 = \frac{z_3 - z_1}{\sqrt{x_1^2 + (y_1 - y_3)^2}}$$

$$\phi_1 - \phi_2 = \tan^{-1}\frac{y_3 - y_1}{x_1} - \tan^{-1}\frac{y_4 - y_1}{x_1},$$

where $(x_3, y_3, z_3)$ is the spatial coordinates of the third device, $(x_4, y_4, z_4)$ is the spatial coordinates of the fourth device, $\phi_1$, $\theta_1$ are respectively a vertical angle and a horizontal angle at which the first device points to the third device, and $\phi_2$, $\theta_2$ are respectively a vertical angle and a horizontal angle at which the first device points to the fourth device.

S3. Determine the transmit beam and/or the receive beam based on the spatial coordinates of the first device and the spatial coordinates of the second device.

Specifically, after the spatial coordinates of the first device and the spatial coordinates of the second device are determined, it can be learned of a direction in which the first device points to the second device.

Optionally, a beam, in beams that can be formed by the first device, whose beam direction and the direction in which the first device points to the second device has an included angle that is less than a threshold may be used as the transmit beam and/or the receive beam, Herein, the transmit beam and/or the receive beam are/is used for beam training between the first device and the second device.

2. Second determining method: The transmit beam and/or the receive beam are/is determined by querying a mapping relationship table between information and the transmit beam and/or the receive beam based on the information carried in the data frame and information obtained in a process of receiving the data frame.

It may be understood that this application is not limited to the foregoing two determining methods. During specific implementation, the transmit beam and/or the receive beam of the first device may alternatively be determined in another manner in this application.

3. Embodiment 3

In this embodiment, a first device may obtain spatial location indication information of the first device and spatial location indication information of a second device through a network. Optionally, a network server may store the spatial location indication information of the first device and the spatial location indication information of the second device, and the first device may obtain the spatial location indication information of the first device and the spatial location indication information of the second device from the network server through a network connection.

Optionally, the spatial location indication information of the first device may include spatial coordinates of the first device. The spatial location indication information of the second device may also include the spatial coordinates of the first device. The spatial coordinates may be represented by using a latitude and longitude, polar coordinates, or three-dimensional coordinates.

The following describes how the first device determines the transmit beam and/or the receive beam after obtaining the spatial location indication information of the first device and the spatial location indication information of the second device.

With reference to the first determining method in step S120 in the method embodiment shown in FIG. 4, in the determining method, that the first device determines the transmit beam and/or the receive beam based on the spatial coordinates of the first device and the spatial coordinates of the second device may include the following steps.

S1. Determine spatial coordinates of the first device based on the spatial location indication information of the first device, and determine spatial coordinates of the second device based on the spatial location indication information of the second device.

S2. Determine the transmit beam and/or the receive beam based on the spatial coordinates of the first device and the spatial coordinates of the second device.

It may be understood that this application is not limited to the foregoing determining methods. During specific implementation, the transmit beam and/or the receive beam of the first device may alternatively be determined in another manner in this application.

According to Embodiment 1, Embodiment 2, and Embodiment 3, the first device may receive the data frame that carries the indication information of the first device and the indication information of the second device; and determine, based on the information carried in the data frame, the transmit beam and/or the receive beam used for beam training between the first device and the second device.

In an optional embodiment, the first device may send the received data frame or information determined based on the data frame to the second device, and the second device may determine, by using the received information, a transmit beam and/or a receive beam of the second device that are/is used for beam training between the second device and the first device. Optionally, the first device may send the received data frame to the second device, and the second device may determine the spatial coordinates of the second device and the spatial coordinates of the first device by using information carried in the data frame (which is the same as the determining method used by the first device in the foregoing embodiment), and determine, based on the spatial coordinates of the second device and the spatial coordinates of the first device, a transmit beam and/or a receive beam of the second device, or the second device may determine a transmit beam and/or a receive beam of the second device based on a mapping relationship between information carried in the data frame and a transmit beam and/or a receive beam. Optionally, the first device may send, to the second device, information determined based on the received data frame, for example, the spatial coordinates of the first device, the spatial coordinates of the second device, and angle information of a direction in which the first device points to the second device, so that the second device determines a transmit beam and/or a receive beam of the second device.

The foregoing describes in detail the beam training method in this application. To better implement the foregoing method, correspondingly, a related apparatus in this application is provided below.

Figure 17:
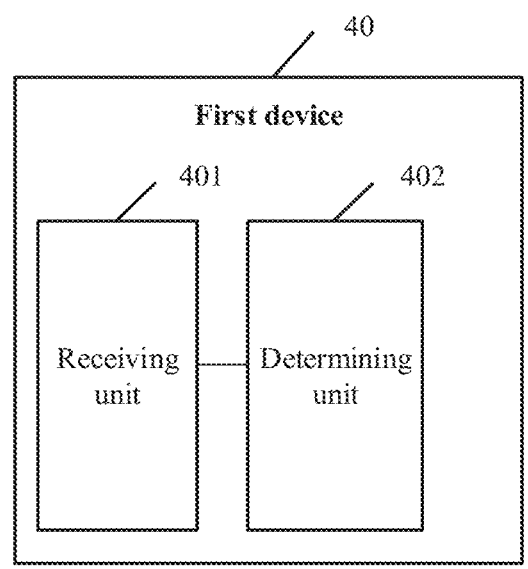
FIG. 17 is a functional block diagram of a first device according to this application.

FIG. 17 is a functional block diagram of a first device 40 according to this application. As shown in the figure, the first device 40 may include a receiving unit 401 and a determining unit 402.

The receiving unit 401 is configured to receive a data frame, where the data frame carries spatial location indication information of the first device and spatial location indication information of a second device.

The determining unit 402 is configured to determine, based on the data frame, a transmit beam and/or a receive beam used for beam training between the first device and the second device.

It may be understood that for specific implementation of functional units included in the first device 40, refer to related descriptions in the foregoing method embodiments. Details are not described herein again.

During implementation of this application, the first device may determine the transmit beam and/or the receive beam used for beam training between the first device and the second device. During beam training, transmit sector sweep may be performed by using the determined transmit beam, and receive sector sweep may be performed by using the determined receive beam, without a need to traverse all sector beams, so that a sector sweep range is converged, and a time consumed for beam training can be reduced, thereby improving beamforming efficiency.

All or some of the foregoing embodiments may be implemented through software, hardware, firmware, or any combination thereof. When software is used to implement the embodiments, all or some of the embodiments may be implemented in a form of a computer program product. The computer program product includes one or more computer instructions. When the computer program instructions are loaded and executed on a computer, all or some of the procedures or functions according to this application are generated. The computer may be a general-purpose computer, a special-purpose computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line) or wireless (for example, infrared, radio, or microwave) manner. The computer-readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive, or the like.

What is claimed is:

1. A beam training method, comprising:
receiving, by a first device, a data frame, wherein the data frame carries spatial location indication information of the first device and spatial location indication information of a second device; and
determining, by the first device based on the data frame, at least one of a transmit beam or a receive beam used for beam training between the first device and the second device, wherein:
the spatial location indication information of the first device comprises a beam identifier of a second beam, angle information of the second beam, a transmit power of a second beam sweep frame, a beam identifier of a third beam, and spatial coordinates of a third device, and
the second beam corresponds to the second beam sweep frame, the third beam corresponds to a third beam sweep frame, and the second beam sweep frame and the third beam sweep frame are sent by the third device to the first device.

2. The method according to claim 1, wherein the spatial location indication information of the first device comprises angle information of a first beam, and
wherein the first beam corresponds to a first beam sweep frame in beam sweep frames that are sent by the third device and that are received by the first device, the first beam sweep frame comprising one of:
a beam sweep frame with an optimal signal quality,
a beam sweep frame whose signal quality is greater than a threshold, or
an earliest received beam sweep frame.

3. The method according to claim 1, wherein the spatial location indication information of the first device comprises a beam identifier of a fourth beam,
wherein the fourth beam corresponds to a fourth beam sweep frame in beam sweep frames that are sent by the first device and that are received by the third device, the fourth beam sweep frame comprising one of:
a beam sweep frame with an optimal signal quality,
a beam sweep frame whose signal quality is greater than a threshold, or
an earliest received beam sweep frame.

4. The method according to claim 1, wherein the spatial location indication information of the first device comprises information related to the third device and information related to a fourth device.

5. The method according to claim 1, wherein the spatial location indication information of the first device comprises spatial coordinates of the first device, and the spatial location indication information of the second device comprises spatial coordinates of the second device.

6. A first device, comprising:
a receiver configured to receive a data frame that carries spatial location indication information of the first device and spatial location indication information of a second device;
at least one processor; and
a non-transitory computer-readable storage medium coupled to the at least one processor and storing programming instructions for execution by the at least one processor, wherein the programming instructions instruct the at least one processor to:
determine, based on the data frame, at least one of a transmit beam or a receive beam used for beam training between the first device and the second device, wherein:
the spatial location indication information of the first device comprises a beam identifier of a second beam, angle information of the second beam, a transmit power of a second beam sweep frame, a beam identifier of a third beam, and spatial coordinates of a third device, and
the second beam corresponds to the second beam sweep frame, the third beam corresponds to a third beam sweep frame, and the second beam sweep frame and the third beam sweep frame are sent by the third device to the first device.

7. The first device according to claim 6, wherein the spatial location indication information of the first device comprises angle information of a first beam, and
wherein the first beam corresponds to a first beam sweep frame in beam sweep frames that are sent by the third device and that are received by the first device, the first beam sweep frame comprising one of:
a beam sweep frame with an optimal signal quality,
a beam sweep frame whose signal quality is greater than a threshold, or
an earliest received beam sweep frame.

8. The first device according to claim 6, wherein the spatial location indication information of the first device comprises a beam identifier of a fourth beam, and
wherein the fourth beam corresponds to a fourth beam sweep frame in beam sweep frames that are sent by the first device and that are received by the third device, the fourth beam sweep frame comprising one of:
a beam sweep frame with an optimal signal quality,
a beam sweep frame whose signal quality is greater than a threshold, or
an earliest received beam sweep frame.

9. The first device according to claim 6, wherein the spatial location indication information of the first device comprises information related to the third device and information related to a fourth device.

10. The first device according to claim 6, wherein the spatial location indication information of the first device comprises spatial coordinates of the first device, and the spatial location indication information of the second device comprises spatial coordinates of the second device.

11. A beam training method, comprising:
generating, by a network device, a data frame, wherein the data frame carries spatial location indication information of a first device and spatial location indication information of a second device; and
sending, by the network device, the data frame to the first device, wherein the first device is configured to determine, based on the data frame, at least one of a transmit beam or a receive beam used for beam training between the first device and the second device, wherein:
the spatial location indication information of the first device comprises a beam identifier of a second beam, angle information of the second beam, a transmit power of a second beam sweep frame, a beam identifier of a third beam, and spatial coordinates of a third device, and
the second beam corresponds to the second beam sweep frame, the third beam corresponds to a third beam sweep frame, and the second beam sweep frame and the third beam sweep frame are sent by the third device to the first device.

12. The method according to claim 11, wherein the spatial location indication information of the first device comprises angle information of a first beam, and
wherein the first beam corresponds to a first beam sweep frame in beam sweep frames that are sent by the third device and that are received by the first device, the first beam sweep frame comprising one of:
a beam sweep frame with an optimal signal quality,
a beam sweep frame whose signal quality is greater than a threshold, or
an earliest received beam sweep frame.

13. The method according to claim 11, wherein the spatial location indication information of the first device comprises a beam identifier of a fourth beam, and
wherein the fourth beam corresponds to a fourth beam sweep frame in beam sweep frames that are sent by the first device and that are received by the third device, the fourth beam sweep frame comprising one of:
a beam sweep frame with optimal signal quality,
a beam sweep frame whose signal quality is greater than a threshold, or
an earliest received beam sweep frame.

14. The method according to claim 11, wherein the spatial location indication information of the first device comprises information related to the third device and information related to a fourth device.

15. The method according to claim 11, wherein the spatial location indication information of the first device comprises spatial coordinates of the first device, and the spatial location indication information of the second device comprises spatial coordinates of the second device.

* * * * *